United States Patent
Ueta et al.

(10) Patent No.: US 7,073,795 B2
(45) Date of Patent: Jul. 11, 2006

(54) METALLIC GASKET

(75) Inventors: Kosaku Ueta, Okabe-machi (JP); Hideo Watanabe, Ina-machi (JP)

(73) Assignee: Japan Metal Gasket Co., Ltd. (JP)

( * ) Notice: Subject to any disclaimer, the term of this patent is extended or adjusted under 35 U.S.C. 154(b) by 154 days.

(21) Appl. No.: 10/450,074

(22) PCT Filed: Nov. 12, 2002

(86) PCT No.: PCT/JP02/11794

§ 371 (c)(1),
(2), (4) Date: Jun. 9, 2003

(87) PCT Pub. No.: WO03/085293

PCT Pub. Date: Oct. 16, 2003

(65) Prior Publication Data

US 2004/0155412 A1    Aug. 12, 2004

(30) Foreign Application Priority Data

| Apr. 4, 2002 | (JP) | 2002-102437 |
| Jun. 5, 2002 | (JP) | 2002-164260 |
| Jul. 17, 2002 | (JP) | 2002-208718 |
| Jul. 18, 2002 | (JP) | 2002-209387 |
| Jul. 31, 2002 | (JP) | 2002-223901 |
| Aug. 28, 2002 | (JP) | 2002-248920 |
| Oct. 18, 2002 | (JP) | 2002-304210 |

(51) Int. Cl.
    *F02F 11/00*    (2006.01)

(52) U.S. Cl. .............. 277/591; 277/592; 277/595; 277/596

(58) Field of Classification Search .......... 277/591–596

See application file for complete search history.

(56) References Cited

U.S. PATENT DOCUMENTS

| 4,721,315 A |   | 1/1988 | Ueta ................ 277/235 |
| 4,830,698 A | * | 5/1989 | DeCore et al. ...... 156/219 |
| 5,582,415 A |   | 12/1996 | Yoshida et al. .... 277/235 |
| 5,639,103 A | * | 6/1997 | Jeanne et al. ...... 277/596 |
| 6,343,795 B1 | * | 2/2002 | Zerfass et al. ..... 277/593 |
| 6,502,830 B1 | * | 1/2003 | Teranishi et al. ... 277/594 |
| 2002/0000696 A1 |   | 1/2002 | Okazaki et al. .... 277/592 |

FOREIGN PATENT DOCUMENTS

| EP | 0 853 204 A1 | 7/1998 |
| JP | 61-177256 | 8/1986 |
| JP | 63036877 | 2/1988 |

(Continued)

*Primary Examiner*—Enoch Peavey
(74) *Attorney, Agent, or Firm*—Young & Basile, P.C.

(57) ABSTRACT

A metallic gasket having a first seal line SL1 arranged in a manner to encircle the peripheral edge of an exhaust gas hole 3, a second seal line SL2 arranged along the outer peripheral edge of a base plate 2, and full beads 6, 7 formed each in a convex cross-section by bending the base plate 2 along both seal lines. Elastic sealing material 8 to 11, the height of which is substantially equal to the height of a convex portion of the beads, are fixed to the convex portion and a flat surface continuous to the convex portion. The elastic sealing material on the flat surface is so arranged as to cover up to the opening mouth position of the exhaust gas hole 3 or a peripheral edge position of the base plate 2 and, furthermore, elastic material parts 12, 13 are filled in a concave portion of the bead on the reverse side of the convex portion. This structure of the gasket leads to cost reduction and enables the gasket to maintain a stable sealing performance for a long period of time.

19 Claims, 19 Drawing Sheets

FOREIGN PATENT DOCUMENTS

| | | |
|---|---|---|
| JP | 1297843 | 11/1989 |
| JP | 02050562 | 4/1990 |
| JP | 06101761 | 4/1994 |
| JP | 09100916 | 4/1997 |
| JP | 09144887 | 6/1997 |
| JP | 11315931 | 11/1999 |
| JP | 2001206687 | 1/2000 |
| JP | 2000230640 | 8/2000 |
| JP | 2001032938 | 2/2001 |
| JP | 2001173791 | 6/2001 |
| JP | 2002032938 | 1/2002 |
| JP | 2002032941 | 1/2002 |

* cited by examiner

METALLIC GASKET

TECHNICAL FIELD

The present invention relates to a metallic gasket sandwiched between opposing joint surfaces of a cylinder block and a cylinder head that form an internal combustion engine for use in motorcycles, automobiles, industrial machines, and outboard engines to seal the above-mentioned joint surfaces.

BACKGROUND ART

Among conventional metallic gaskets of this kind, there is one which gasket described in Japanese Patent Laid-Open No. Hei 6-101761, for example. As shown in FIG. 38, this metallic gasket comprises a base plate made of a sheet of thin metal, and the base plate has a first thickness-increased portion 52 formed by fitting a grommet, for example, on the peripheral portion of the base plate defining an opening, such as a combustion chamber opening, and a rubber bead 53 formed by baking a rubber material so as to protrude from both surfaces of the base plate 50 along a seal line extending in the vicinity of the outer periphery of the base plate 50. The metallic gasket also has a second thickness-increased portion 54 formed by folding back part of the peripheral edge portion of the base plate 50, and a recoverable elastic body 55 disposed between the grommet and both surfaces of the base plate 50.

In other words, the outer peripheries of openings, such as an oil hole or a water hole, formed in the base plate 50 are sealed by surrounding the openings with a rubber bead protruding from both surfaces of the base plate 50, and the compression-deformed amount of the rubber bead 53 is regulated by the thickness-increased portions 52, 53 to thereby prevent the rubber bead 53 from being broken. To prevent. breakdown of the rubber bead 53 under compression, the compression-deformed amount of the rubber bead 53 is normally set at a maximum of about 40% or less, for example.

As another conventional metallic gasket, there is one which is described in Japanese Patent Laid-Open No. 2001-206687

As shown in FIG. 39, this metallic gasket has a first thickness-increased portion 52 formed by folding back the peripheral edge portion on the combustion chamber opening 51 side of the base plate, and inserting a shim plate 58 into the inside of the folded portion, and a second thickness-increased portion 54 formed by folding back part of the peripheral portion of an oil hole or the outer peripheral edge of the base plate, for example. In this metallic gasket, two lines of metal bead 60 in a convex-concave profile (a convex portion is formed similarly on both surfaces of the base plate 50) are formed by bending the base plate 50 in a manner to protrude on both surfaces of the base plate 50 between the first and second thickness-increased portions 52, 54, and an elastic sealing material 61 is filled in the concave portion on the reverse side of the metal bead 60. When it is desired to provide a less expensive gasket, galvanized iron is used as the material for the base plate 50.

In the former example of prior art, however, out of the thickness of the rubber bead 53, only the amount of the thickness that extends beyond the thickness-increased portions 52 and 54 is compressed and deformed to generate resilience to provide a seal. Since the rubber bead 53 needs to be formed on a flat portion so as to protrude from both surfaces of the base plate 50, the amount of rubber used to form the rubber bead 53 is limited, so that the compression-deformed amount has to be small. Consequently, the degree of demand for dimensional accuracy of the rubber bead 53 is high, the amount of concurrent deformation is small, processing of the rubber bead 53 becomes difficult, and processing accuracy becomes severe.

For example, if the thickness 0.7 t of the first thickness-increased portion 52 is designated as T0 and the thickness 0.4 t of the base plate is designated as T1, the height T2 protruding to one side from the base plate is $$\begin{aligned} T2 &= (T0\ T1)\ 2 + \text{compression-deformed amount} \\ &= 0.15 + 0.15 = 0.4 \\ &\quad \text{(which means the compression-deformed amount of 40\% max.)} \\ &= 0.21 \end{aligned}$$

Therefore, the protruding amount of the rubber bead on one side of the base plate is 0.21 mm. Although there is a large difference between the thickness 0.7 t of the first thickness-increased portion and the thickness 0.4 t of the base plate, the rubber bead 53 has a very small amount of rubber and therefore its compression-deformed amount is small; therefore, the rubber bead 53 becomes hard to process, and the processing accuracy becomes stricter as mentioned above.

The rubber bead 53 and a recoverable elastic bodies 55 in the end face of the first thickness-increased portion 52 and the first thickness-increased portion, directly exposed to cooling water, are liable to rusting or water absorption, thus increasing chances of deterioration in performance and degeneration in quality.

As described above, when a rubber bead 53 is formed on a flat surface of the base plate 50, supposing that a metallic gasket is interposed between the joint surfaces of a cylinder head and a cylinder block, for example, a difference in thermal expansion between the cylinder head and the cylinder block gives rise to a dislocation, which causes a shearing force to be applied along the surface of the base plate 50, increasing a possibility of the rubber bead 53 separating from the base plate 50.

Since there is a gap between the base plate and each of the joint surfaces in the region from the water hole to the seal line, if cooling water other than specified is used, the base plate from the water hole to the seal line is susceptible to corrosion by the cooling water other than specified.

Further, in the region between the outer peripheral edge and the seal line (the position where the rubber bead 53 is formed) of the base plate exclusive of the folded-back portion (the second thickness-increased portion 54) of the peripheral portion of the base plate 50, because there is a gap between both side surfaces of the base plate and each of the joint surfaces of the base plate 50, assuming that the metallic gasket is used in a outboard engine, filthy water or briny water externally enters the above-mentioned gap, giving rise to corrosion of the joint surfaces of parts of cast iron or aluminum and the exposed portions of the gasket base plate 50.

Further, since cooling water directly contacts the first thickness-increased portion 52 formed by the folded-back metal and the folded-back grommet on the combustion chamber opening 51 side at high temperature, boiled water generates air bubbles inhibit the cooling effect, increasing chances of overheat. On the other hand, since cooling water directly contacts the rubber seal line, alcohol content or ethylene glycol in cooling water causes corrosion or swelling to the whole of the rubber bead 53, thus reducing durability.

In the latter example of prior art, the metallic gasket comprises a first thickness-increased portion 52 formed by folding back the whole peripheral edge on the combustion chamber side of the phase plate to seal off a high-pressure gas, and a second thickness-increased portion 54 to prevent the engine from deformation and also to protect the bead 60 (including the elastic sealing material 61) from excessive compression. Since the second thickness-increased portion 54 is formed by partly folding back the outer peripheral edge portion, in the region from the seal line by the bead 60 disposed near the outer peripheral edge of the base plate 50 or on the inner side of the bolt to the outer peripheral edge of the engine, a gap occurs on both surfaces of the base plate by an amount corresponding to the rubber thickness between the seal area joint surfaces) of the engine and the surfaces of the gasket.

Therefore, assuming that the gasket is used in an overboard motor or the like, it occurs that filthy water or briny water splashes and enters the above-mentioned gap, and because the engine radiates heat to the seal area of the engine of cast iron or aluminum and the exposed portions of the gasket base plate 50, the adhesion of briny water or the like causes corrosion.

As the engines which use the above-mentioned metallic gasket are reduced in size and weight, the deck width for the seal area of the engine becomes narrower, and it becomes difficult to secure a space for forming a wide metal bead 60 in a wide, undulated structure protruding on both surfaces of the base plate 50 in addition to the width of the folded-back portion along the peripheral edge of the combustion chamber opening. This can be said of the region around the openings, such as bolt holes, water holes and oil holes. As the engines that uses metallic gaskets become smaller and lighter, a problem is that it becomes difficult to adopt the metallic gasket structure of the prior art (the latter example).

Since the elastic sealing material 61 is used only in the concave portion in contrast to the present patent application, if the hardness of the base plate is low, when the elastic sealing material 61 is deformed in compression, the metal bead 60 is likely to deform in a manner to warp in the through-thickness direction, and when this deformation occurs, this leads to a decrease in sealing pressure by a amount corresponding to the deformation.

Further, another example of the conventional metallic gasket is disclosed in Japanese Patent Laid-Open 2001-173791, for example.

As shown in FIG. 40, this metallic gasket comprises two base plates 50.

More specifically, out of the two base plates 50, a thickness-increased portion 52 is formed at the edge portion on the combustion chamber opening 51 side of a thicker base plate (upper base plate). A base-plate bead 53 of a convex structure is formed on each of the two base plates 50 in a position on the outer side of the thickness-increased portion 52 and at a height higher than the thickness-increased portion 52. The metallic gasket is composed by stacking two base plates 50 in such a way that the convex portion sides of the two base-plate beads 53 face each other. Further, the concave portions facing outside are filled with an elastic sealing material 54.

When the metallic gasket is disposed between opposing joint surfaces of a cylinder block and a cylinder head and fastened with clamping bolts, the base-plate beads 53 are compressed and deformed down to the thickness of the thickness-increased portion around the inner peripheral edge of the combustion chamber opening and simultaneously the elastic sealing material 54 filled in the concave portion is compressed and deformed to seal a combustion gas, oil, and cooling water pressures by a sealing pressure from a composite spring made up of the spring force of the base-plate bead 53 and the spring force of the elastic sealing material 54. Needless to say, there are conventional metallic gaskets without any elastic sealing material 53 filled in the concave portion and also there are conventional metallic beads made up of a single piece of base plate.

In this conventional metallic gasket (Refer to FIG. 40), however, the base-plate bead 53 and the elastic sealing material 54, when deformed by fastening, jointly generate a resilience to apply a required sealing pressure along the seal line.

However, when the base plate 50 is formed by metal plate of low hardness to prevent fatigue failure and reduce cost of the base plate 53, in the above metallic gasket, when bolts are fastened and the elastic sealing material 54 of the concave portion of the bead is compressed and deformed, an external force is applied such that the base plates 50 and the base-plate beads 53 are compressed and deformed in a manner to warp in the through-thickness direction. Since the base plates 50 are formed of metal of low hardness as mentioned above, the beads have a low shape-retaining force and accordingly the base plate 50 have an insufficient deformation-preventive force and hence a low sealing property.

By repeated load by repetition of operation and stoppage of the engine, after a long period of use, problems arise, such as a decrease in axial tension of the clamping bolts, changes with time of the base-plate bead 53 on the base plate 50, or deterioration in the elastic sealing material 54 of the concave portion of the bead; therefore, the sealing surface pressure is likely to drop. Such problems tend to occur particularly at overhanging parts on the outer side of the clamping bolts.

When the elastic sealing material 54 is formed by baking in the concave portions of the base plates, even if the elastic sealing material 54 at high temperature is filled in the concave portions, it changes in volume by an amount of thermal expansion during subsequent cooling and being left open, the center portion of the elastic sealing material 54 where the thickness is at its highest contracts by an amount of thermal shrinkage. This is disadvantageous when the surface pressure drops as described above. Such a phenomenon as this seems to be likely to occur particularly when the gasket is mounted in the engine which has been assembled with a weak fastening axial tension.

SUMMARY OF THE INVENTION

The present invention has been made to solve the above problems, and has as its task to provide a metallic gasket capable of reducing cost and securing a stable seal performance for a long period of time.

To achieve the above task, there is provided a metallic gasket comprising a base plate made of a thin metal plate, said base plate having formed therein one or not less than two openings and a metal bead of a convex cross-section formed along seal lines by bending said base plate in a through-thickness direction thereof, said metal bead being deformed in the through-thickness direction to seal opposing joint surfaces when said metallic gasket is sandwiched between said joint surfaces, wherein an elastic sealing material deformable under compression in cooperation with deformation of said metal bead is fixed at least to a convex portion of said metal bead and is filled in a concave portion on the reverse side of said convex portion, and the height of said elastic sealing material on a surface of said convex portion side is made equal to or substantially equal to the height of said convex portion, and wherein said elastic sealing material deformable under compression in cooperation with the deformation of said metal bead is fixed also to portions of said surface of the base plate facing at least one of an outer peripheral edge of said joint surface and an inner peripheral portion of an opening of said joint surface located opposite said surface of the base plate.

Preferably, the largest bead width of the elastic sealing material on the convex portion side is limited within 1.5 times the width of the metal bead with the exception of the bolted portions which are subjected to a large pressure. It is necessary to apply more load to the base plate as the width of the rubber bead becomes larger. From a viewpoint of inhibiting an increase in load, it is desirable to limit the width of the bead of the elastic sealing material within 1.5 times the width of the metal bead as mentioned above. This does not apply to where a large load is to be applied locally.

The thickness (height) of the elastic sealing material may be set from a standpoint that the compression-deformed amount is not more than 40% when the gasket is disposed between the joint surfaces, for example, a value which does not give rise to compression fracture.

According to the invention, as a result of the metal bead being formed so as to be convex only on one surface of the base plate, the amount of elastic sealing material can be more than when the rubber bead portions are formed on both surfaces of the base plate, and consequently the compression-deformed amount of the elastic sealing material is larger and the processing accuracy can be made less severe.

Further, since the elastic sealing material is fixed to the convex portion, in other words, to the inclined surface of the metal bead, there are less chances of the elastic sealing material separating from the base plate. Moreover, since the elastic sealing material is fixed to the convex portion, the bead width is prevented from becoming wider than necessary. The elastic sealing material on the convex portion serves to inhibit such a deformation of the base plate from warping by the elastic sealing material on the concave portion.

Further, since a required sealing pressure is generated by synergy of the resilience of the metal bead and the elastic resilience of the elastic sealing material fixed to the position of the metal bead, the hardness of material for the base plate can be lowered.

Since it is possible to obtain a wider sealing area by the elastic sealing material without widening the bead width more than necessary, the flaws, casting-blowholes and surface roughness on the joint surfaces can be absorbed, and the joint surfaces can be sealed satisfactorily with a low surface pressure.

On the surface on the convex portion side of the base plate where a gap appears between the joint surfaces and the base plate, the elastic sealing material is fixed to a position that faces the outer peripheral edge portion on the opposing joint surface, for example, and this prevents infiltration of water into the gap from the outside.

For the ease of process or the like, it is desirable that the elastic sealing material fixed to the convex portion of the metal bead is integral with and continuous to the elastic sealing material facing the outer peripheral edge portion, for example, on the opposing joint surface, but it is all right even if they are not continuous and separate.

The height of the elastic sealing material facing the outer peripheral edge portion on the joint surface need not necessarily be equal or substantially equal to the height of the convex portion, and it does not matter whether the former height is higher or lower than the elastic sealing material formed on the convex portion.

The invention is characterized in that the above-mentioned metal bead is a full bead or a half bead in a stepped form.

The invention is also characterized in that by partly varying at least one of the height of the protrusion and the width of the metal width in the extending direction of the metal bead, the sealing surface pressure is equalized in the extending direction of the bead.

According to the present invention, in low-rigidity portions on the joint surface, the height of the bead is made relatively higher or the width of the bead is made wider to thereby increase a spring force of the bead there, and thus the sealing surface pressure is equalized in the extending direction of the bead, in other words, along the seal lines, and consequently a fastening force of the bolts can be utilized efficiently.

In other words, by varying the height and the width of the bead according to the rigidity of the surface to be sealed on the joint surface, the spring stress is varied which is generated by the elastic sealing material filled in the concave portion or by the elastic sealing material fixed on the convex portion side of the bead, making it possible to apply a necessary sealing pressure to the sealing area that is low in rigidity.

The invention is also characterized in that the above-mentioned metal bead is formed along at least one of the inner peripheral edge of the opening in the base plate and the outer peripheral edge of the base plate.

The invention is also characterized in that at least a part of the outer peripheral edge of the base plate extends beyond the opposing joint surface to the outside.

According to this invention, by making the outer peripheral contour of the base plate larger than the joint surfaces, the elastic sealing material fixed to the outer peripheral edge may face the outer peripheral edge of the opposing joint surface with an increased tolerance, making it possible to securely prevent entry of salt water or the like, for example, from the outside.

The invention is also characterized in that to the whole peripheral edge or a part thereof in at least one of the inner peripheral edge of the sealing surface pressure formed in the base plate and the outer peripheral edge of the base plate, a thickness-increased portion is formed, on the base plate, with a thickness higher than the remaining areas of the base plate and lower than the convex portion of the metal bead to regulate the deformed amount in the through-thickness direction of the elastic sealing material.

According to the present invention, as a result of the compression-deformed amount of the elastic sealing material being securely regulated by the thickness-increased portion, the elastic sealing material can maintain its elasticity for a long period of time.

The invention is also characterized in that a thin corrosion-resistant film thinner than the above-mentioned elastic sealing material is fixed to the areas not covered with the elastic sealing material at least on one surface of the base plate.

According to this invention, even if salt water or liquid filth penetrates in a gap between the base plate and the joint surfaces, at least the surface of the base plate can be protected from corrosion.

The invention is also characterized in that a metallic gasket comprising a base plate made of thin metal plate having at least a combustion chamber opening and a liquid hole, a thickness-increased portion formed at an inner peripheral edge on the combustion chamber opening side of the base plate, and a bead formed along a seal line for sealing by deforming in the through-thickness direction, wherein at least a part of the seal line is arranged in a manner to encircle one or not less than two liquid holes, wherein a bead formed along the seal line encircling at least the liquid hole comprises a metal bead formed in a convex form with a height higher than the thickness-increased portion by bending the base plate in the through-thickness direction, and a rubber bead made of an elastic sealing material fixed to the surface on the convex portion side of the metal bead of the base plate and filled in a concave portion on the reverse side of the convex portion, wherein the elastic sealing material on the surface of the convex portion side is fixed at least to the surface of the convex portion of the metal bead and is arranged to be equal or substantially equal in height to the metal bead, and wherein a corrosion-resistant film is formed on the surface of the base plate surrounded by the bead formed along the seal line encircling the liquid hole on the convex portion side of the metal bead and the film has a height lower than the height of the rubber bead.

The above-mentioned liquid hole is preferably a water hole.

According to this invention, the bead surrounding the liquid hole, such as a water hole, prevents a liquid from the liquid hole leaching out over the bead.

At this time, by forming the bead as a composite bead of a metal bead and a rubber bead as mentioned above. In other words, as a result of the metal bead being formed as a convex form only on the top surface side of the base plate, the amount of the elastic sealing material is larger than when a convex rubber bead is formed on both surfaces of the base plate. Therefore, the compression-deformed amount of the elastic sealing material is larger and the processing accuracy becomes less severe. Since the elastic sealing material is fixed to the convex portion, or the inclined surface, of the metal bead, it is less likely for the elastic sealing material to separate from the base plate.

Further, because a required sealing pressure is generated by synergy of the resilience of the metal bead and the elastic resilience of the elastic sealing material fixed to the metal bead position, the hardness of the base plate material can be decreased. Since it is possible to obtain a wide sealing area by an elastic sealing material, in other words, since an area seal by an elastic sealing material can be applied, the flaws on the joint surface, casting-blowholes, and processing surface roughness can be absorbed, so that a satisfactory sealing can be obtained with a low surface pressure.

In the region from the liquid hole to the bead position, a gap occurs between the surface of the base plate on the convex portion side of the metal bead and the joint surface, but since the corrosion-resistant film is formed on the surface of the base plate, even if the liquid passing through the liquid hole is corrosive, the base-plate surface can be prevented from being corroded.

The invention is also characterized in that a thin, corrosion-resistant film is formed on the surface surrounded by the bead formed along the seal line on the concave portion side of the metal bead, and the film is continuous to the elastic sealing material filled in the concave portion.

The metallic bead according to this invention is so structured as to protrude only on one surface, but also on the surface of the base plate on the concave side of the metal bead and on the liquid hole side rather than on the bead side, there is a risk that the liquid flowing through the liquid hole will contact the surface of the base plate on the concave side of the metal bead through the flaws on the opposing joint surface or by vibration. In this invention, in the presence of the corrosion-resistant film on the surface of the base plate on the concave side, even if the liquid is corrosive, the surface of the base plate can be prevented from being corroded.

The invention is also characterized in that a plurality of through-holes are formed at positions of the base plate surrounded by the bead formed along the seal line encircling the liquid hole, and the films formed on both surfaces of the base plate are connected through the plurality of through-holes.

According to this invention, since the films on both surfaces of the base plate are interconnected through the through-holes, the films are less liable to separate from the base plate. Note that the film on the convex portion side of the metal bead is not in contact with the joint surface, but the film on the concave side of the metal bead is in contact with the joint surface.

The invention is based on the structure set forth supra, and is characterized in that the film is also applied to the inside peripheral surface of the liquid hole.

According to this invention, the inside peripheral surface of the hole, which would otherwise contact the liquid, is protected by the film. At this time, when the film is formed on both the front and reverse surfaces of the base plate, the all of those surfaces and end faces of the base plate on the liquid hole side rather than on the bead side are protected by the film.

The invention is based on the structure set forth supra, and is characterized in that at least a part of the bead formed along the seal line encircling the liquid hole is arranged along the whole peripheral edge of the liquid hole, the elastic sealing material on the convex portion side is arranged up to the film continuous to the elastic sealing material on the convex portion side is applied to the inside peripheral surface of the liquid hole, and that the size of the liquid hole including an amount corresponding to the thickness of the film is substantially equal to the size of the liquid hole open to the joint surfaces to be sealed by the gasket sandwiched therebetween.

According to this invention, by forming the rubber bead close to the liquid hole, since the surface of the base plate on the convex portion side of the metal bead is protected by the rubber bead, the film is not required for the surface of the convex portion side.

The invention is also based on the structure set forth supra and is characterized in that the second thickness-increased portion is formed at a part of the outer peripheral edge of the base plate, and the seal line extending along the outer peripheral edge is arranged at the outer peripheral edge of the base plate or in the vicinity of the outer peripheral edge, excluding the second thickness-increased portion, wherein the bead formed along the seal line comprises a metal bead formed in a convex form higher than the thickness-increased portion by bending the base plate in the through-thickness direction, and a rubber bead made of an elastic sealing material fixed to the surface of the convex portion side of the metal bead of the base plate and filled in the concave portion and compressed and deformed in the through-thickness direction in cooperation with the deformation of the metal bead. the elastic sealing material on the surface of the convex portion side is fixed at least to the surface of the convex portion of the metal bead, and the height of the elastic sealing material is arranged to be equal or substantially equal to the height of the metal bead.

Since the bead structured as described is formed along the outer peripheral edge of the base plate, if there is a possibility that a corrosive liquid, such as salt water, enters from the outside, the rubber bead formed along the outer peripheral edge prevents its entry from the outside. Above all, by forming the bead composed as described, even if there are flaws on the joint surfaces or vibration, because the elastic sealing material is in tight contact with the joint surface, a satisfactory sealing can be applied securely.

Therefore, the above-mentioned film need not be formed on the surface of the base plate between the bead encircling the liquid hole and the bead along the outer peripheral edge of the base plate, because the surface does not contact any corrosive liquid. It follows therefore that the joint surface that faces the surface area of the base plate is also protected from a corrosive liquid.

The invention is also based on the structure supra, and is characterized in that the above-mentioned second thickness-increased portion is omitted, and to substitute for the second thickness-increased portion, a wide-width portion is provided in part along the rubber bead in the extending direction of the rubber bead.

According to this invention, the second thickness-increased portion can be omitted. Therefore, the gasket is so structured to be able to substitute for the second thickness-increased portion even when the second thickness-increased portion of metal cannot be formed for reasons of space.

The invention is also based on the structure set forth supra, wherein a corrosion-resistant film is formed on the whole surface of the base plate on the outer side of the seal line along the outer peripheral edge of the base plate.

According to this invention, in an overboard motor or the like, if there is a possibility that the outer peripheral edge of the base plate contacts a corrosive liquid, such as salt water, it is protected by the above-mentioned film.

The invention is also based on the structure set forth supra, and is characterized in that one or not less than two lines of protrusions are formed along the seal line on at least one of the elastic sealing material fixed to the surface of the above-mentioned convex portion side and the surface of the elastic sealing material filled in the above-mentioned concave portion.

The invention is also based on the structure described supra, and is characterized in that one or not less than two lines of protrusions are formed in the areas where the sealing surface pressure is relatively low at least on one of the surface of the elastic sealing material fixed to the surface of the convex portion side and the surface of the elastic sealing material filled in the concave portion.

The invention is also based on the structure set forth supra, wherein at least one of the height and the width of each line of the protrusions along its extending direction is varied according to the sealing surface pressure at the formed position of said protrusion, and as the sealing surface pressure becomes small, a larger value is set for at least one of the height and the width of the protrusions.

The invention is also based on the structure set forth supra, wherein a plurality of lines of protrusions are formed on at least one of the surface of the elastic sealing material fixed to the convex portion side and on the surface of the elastic sealing material filled in the concave portion, and wherein in the plurality of lines of the protrusions, at least one of a height of the protrusion and an area per unit length of the protrusion is varied according to the sealing surface pressure at the formed position of the protrusion.

The invention is also based on the structure set forth supra, wherein a plurality of base plates are stacked in a multilayered structure.

BRIEF DESCRIPTION OF THE DRAWINGS

FIG. 12 shows a case where the second thickness-increased portion formed in a bolt hole is done away with;

BEST MODE FOR CARRYING OUT THE INVENTION

A first embodiment of the present invention will be described with reference to the accompanying drawings.

Figure 1:
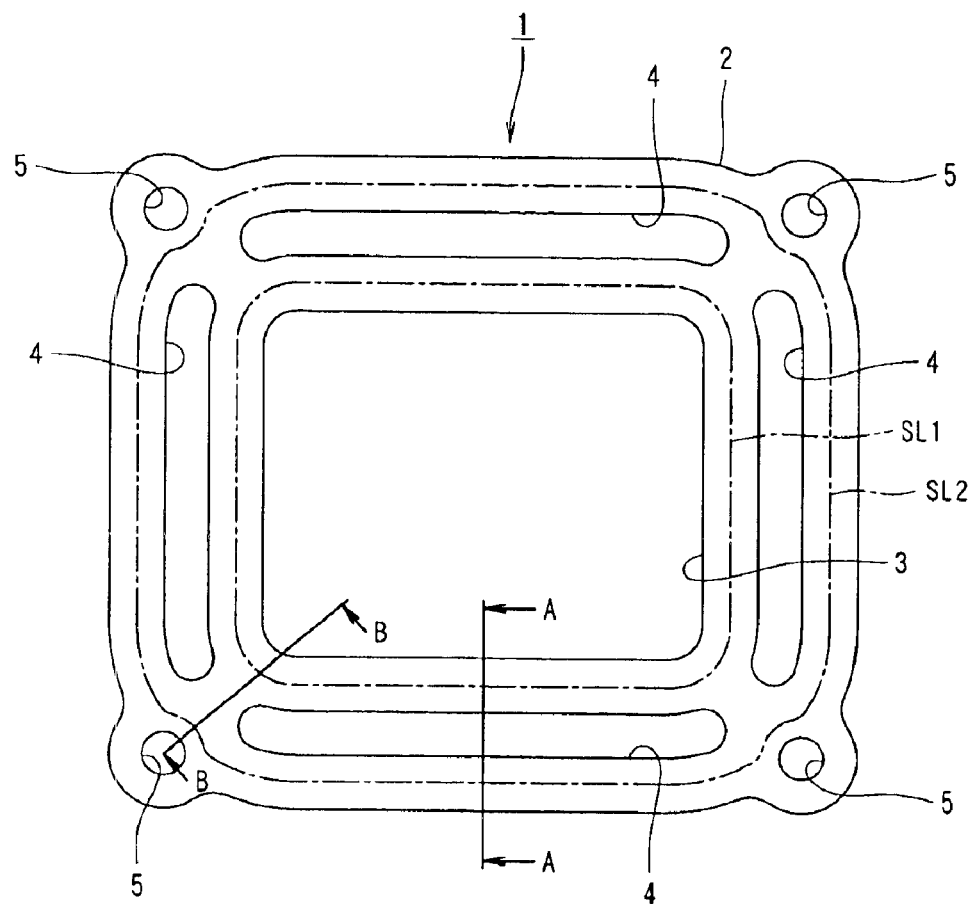
FIG. 1 is a plan view for explaining a metallic gasket according to a first embodiment of the present invention.
Figure 2:
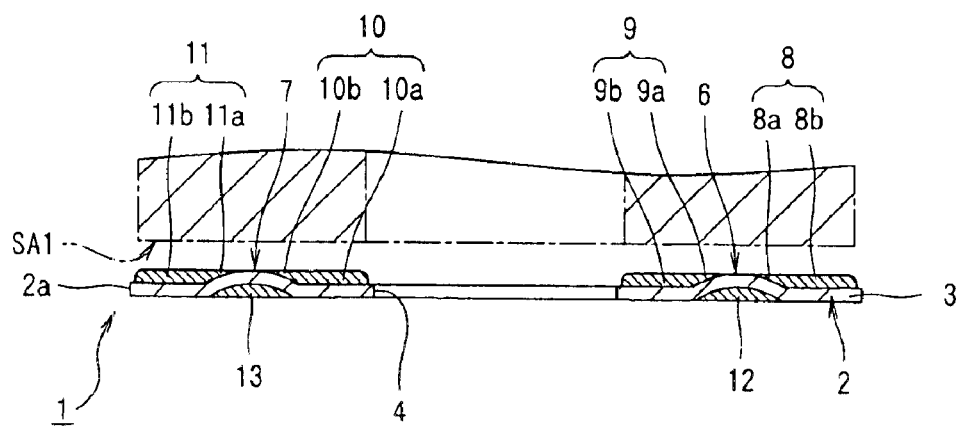
FIG. 2 is a sectional view taken along the line A—A in Fig. 1.
Figure 3:
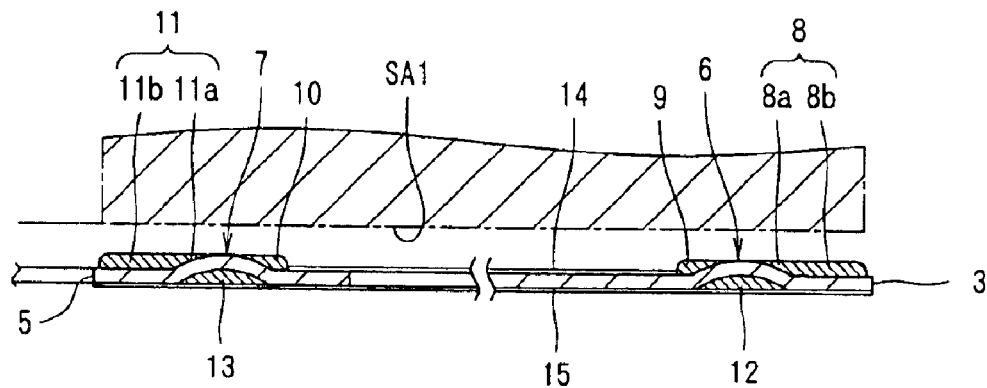
FIG. 3 is a sectional view taken along the line B—B in FIG. 1.

FIG. 1 is a plan view for explaining a metallic gasket according to this embodiment. FIG. 2 is a sectional view taken along the line A—A in Fig. FIG. 3 is a sectional view taken along the line B—B in FIG. 1.

Description will start with the structure of the metallic gasket according to the first embodiment.

A metallic gasket 1 according to this embodiment is an example that bolt holes are located along the outer periphery of the base plate, but this is not intended to show a limitation. The base plate 2 of the metallic gasket 1 comprises metal plate, such as stainless steel plate, soft steel plate or aluminum plate.

In the middle of the base plate 2, as shown in FIG. 1, there is formed a large exhaust gas hole 3 for an exhaust gas at high temperature to pass through, and a first seal line SL1 is provided in a manner to endlessly encircle the exhaust gas hole 3. On the outer side of the first seal line SL1, cooling water holes 4 for passing cooling water to cool the exhaust gas are formed at four positions in a manner to encircle the exhaust gas hole. Further, a second seal line SL2 is provided in an endless circle extending along the edge portion of the outer periphery of the base plate 2. Bolt holes 5 for clamping bolts are formed at four positions on the outer side of the second seal line SL2.

As shown in FIGS. 2 and 3, full beads 6, 7 in a raised shape are formed by bending the base plate 2 along the first and second seal lines SL1, SL2.

Elastic sealing material 8 to 11 consisting of a rubber material, such as fluororubber, NBR or silicon rubber or a resin material are fixed to the surface of the base plate on the convex portion side of the full beads 6, 7, and a similar elastic sealing material 12, 13 are filled in the concave portions on the reverse side of the convex portions of the full beads 6, 7.

The elastic sealing material 8 to 11 fixed to the convex portion side of the full beads 6, 7 cover both sides across the width of the full beads 6, 7, and are fixed to the flat surface of the base plate 2 continuous to the surface of the convex portion from both sides 8a, 9a, 10a and 11a of the convex portion up to the nearby exhaust gas hole 3, cooling water hole 4, or edge portion 2a of the outer periphery of the base plate 2. Reference numerals 8b, 9b, 10b and 11b denote the elastic sealing material parts fixed to the flat surface. Out of the two joint surfaces between which the metallic gasket is disposed, the joint surface SA1 faces the convex portion-side surface of the gasket and has arranged thereon the opening end of the exhaust gas hole 3, the opening end of the cooling water holes 4, and all circumference of the outer periphery of the joint surface SA1. Elastic sealing material 8b, 9b, 10b and 11b have been arranged on the surface of the base plate 2 which faces the joint surface SA1 including the above-mentioned opening end of exhaust gas hole 3, opening end of the cooling water holes 4, and all circumference of the outer periphery of the joint surface SAI with which the elastic sealing material parts come into contact.

The height of the elastic sealing material 8 to 11 fixed to the convex portion side of the full beads 6, 7 is substantially equal to the height of the convex portions of the full beads 6, 7, and the upper surface of the elastic sealing material parts is substantially parallel to the flat surface of the base plate 2.

On the other hand, the amounts of the elastic sealing material 12, 13 filled in the concave portions of the full beads 6, 7 are substantially equal to the capacities of the concave portions, and the upper surfaces of the elastic sealing material parts are substantially flush with the flat surface of the base plate 2.

In this embodiment, the molding of elastic sealing material 8 to 13 may be performed to fix them to the surface of the convex portions and fill them in the concave portions of the base plate 2. For this purpose, passages (not shown) for a molding material may be formed in the full beads 6 and 7 to enable simultaneous molding of the convex portion side and the concave portion side of the beads.

As shown in FIG. 3, an elastic sealing material film 14 superior in durability and thinner than the above-mentioned elastic sealing material is fixed to the flat surface on the convex portion side in the area between the cooling water holes 4. On the other hand, a thin elastic sealing material film 15 is fixed to the whole area of the flat surface on the concave portion side. A through-hole may be formed in the base plate 2 to permit communication between the upper and lower elastic sealing material films 14, 15. When communication is provided between the upper and lower sealing material films, those films 14, 15 are made less susceptible to separation.

In the example of the metallic gasket 1, since the exhaust gas pressure to be sealed is lower than the pressure in the combustion chamber, a thickness-increased portion is not formed to regulate the compressed amount of the elastic sealing material 8 to 13.

When a metallic gasket 1 structured as described is sandwiched between the joint surfaces of the cylinder block and the cylinder head and fastened together, the elastic sealing material 8 to 11 fixed to the convex portion side of the full beads 6, 7 and the elastic sealing material 12, 13 filled in the concave portions are compressed and deformed in the through-thickness direction in cooperation with the full beads 6, 7. Therefore, a dual seal is applied by an elastic resilience of the full beads 6, 7 (including the elastic sealing material 8 to 13 ) formed along the first seal line SLI and the second seal line SL2.

In the metallic gasket 1 structured as described, since the elastic sealing material 8 to 11 are fixed to the convex portions of the full beads 6, 7 and also the like sealing material parts 12, 13 are filled in the concave portions in the full beads 6, 7, the elastic sealing material protruding from the base plate 2 in the through-thickness direction is the sealing material only on the convex portion side of the full beads 6, 7, in other words, only on one side of the base plate 2.

Therefore, if the height of the beads which are deformed after bolts are fastened is designated as t0, the height of the elastic sealing material 8 to 11 fixed to the convex portions of the full beads 6, 7, for example, is t0+the compression-deformed amount (t0 ⋝0.4 (40% max.)). If t0 is 0.5 mm, the height of the elastic sealing material 8 to 11 is 0.7 mm from the above equation. Therefore, the elastic sealing material 8 to 11 on the convex portions of the full beads 6, 7 becomes large in quantity, which results in an increase in the compression-deformed amount, making it easy to form the elastic sealing material 8 to 11 and making it possible to increase the thickness of the elastic sealing material parts, so that the amount of concurrent deformation becomes large and a large processing tolerance can be set, making it possible to decrease production cost.

The elastic sealing material 8 to 11 fixed to both sides across the width of the convex portions of the full beads 6, 7 are exposed to cooling water at the areas thereof facing the water hole 4 side, and on the other hand the elastic sealing material 12, 13 filled in the concave portions of the full beads 6, 7 are covered with the full beads 6, 7 and therefore are not exposed to cooling water, for which reason, the elastic sealing material parts are protected from deterioration and can maintain a stable seal performance for a long period of time.

Further, a required sealing pressure is obtained by synergy of the resilience of the full beads 6, 7 and the elastic resilience of the elastic sealing material 8 to 11 fixed to the convex portion side and filled in the concave portion side of the full beads 6, 7, a fact which makes it possible to decrease the hardness of the base plate 2, eliminate worries about fatigue failure of the beads 6, 7 of the base plate 2, further absorb the engine vibration amplitude and the seal area roughness, and thereby seal off cooling water pressure as well as oil pressure with less surface pressure.

Further, since a wide sealing area can be secured for the elastic sealing material 8 to 11 on the convex portion side of the beads 6, 7 and for the elastic sealing material 12, 13 on the concave portion side of the full beads 6, 7, the flaws on the joint surfaces and the blowholes that occur in casting and the working surface roughness can be sealed satisfactorily with a low surface pressure. Furthermore, since the elastic sealing material 8 to 13 consist of an elastic substance (rubber-based material, above all else), the gasket factor is low, and therefore a limited axial load can be utilized effectively in the areas under adverse condition, so that total load can be decreased. Incidentally, since the elastic sealing material parts, which form the rubber beads, are disposed chiefly on the convex portions of the metal beads, the bead width need not be made wide unnecessarily.

At the full bead 7 formed along the second seal line SL2 on the outer periphery side, since the surface pressure is at its highest where bolts are fastened and in their vicinity, it is possible to decrease the surface pressure in the vicinity of where bolts are fastened by reducing the width of the beads compared with other regions or by lowering the height of the beads near the bolt holes to thereby equalize the seal area pressure by the full bead 7 (including the elastic sealing material 10, 11 ) along the second seal line SL2. By this equalization, the axial force of the clamping bolts can be reduced.

In the above-mentioned metallic gasket 1, because the beads 6, 7 protrude only on one surface of the base plate and also because the elastic sealing material 12, 13 are filled in the concave portions of the beads 6, 7, the whole surface of the base plate 2 on the concave portion side of the beads 6, 7 are in contact with the corresponding joint surface. For this reason, there is no place where a gap can occur between the above-mentioned surface of the base plate 2 and the joint surface.

On the other hand, on the surface on the convex portion side of the bead 6 formed along the first seal line, because there is provided the elastic sealing material 8b equal in height to the bead 6 in the region of the base plate which faces the inner peripheral end portion encircling the exhaust gas bore 3 on the opposing joint surface, when the bolts are fastened, the elastic sealing material 8b is compressed and deformed to thereby seal the whole inner peripheral edge of the exhaust gas bore 3 by the elastic sealing material 8b.

The elastic sealing material 11b is provided on the outer periphery side of the base plate 2 on the surface of the convex portion side of the bead 7 and at a position facing the outer periphery end portion on the opposing joint surface. Therefore, as the elastic sealing material 11b is compressed and deformed when bolts are fastened, the whole peripheral edge portion on the opposing joint surface is sealed by the elastic sealing material 11b. Thus, water or the like is prevented from externally entering between the surface of the base plate 2 and the joint surface SA1.

Further, since the elastic sealing material 9b, 10b are provided on the inner peripheral region encircling each cooling water hole 4 on the surface of the convex portion side of the beads 6, 7, the elastic sealing material 9b, 10b are in contact with the inner peripheral region of each cooling water hole on the opposing joint surface, thereby sealing the joint. Though there is not an elastic sealing material equal in height to the beads between the cooling water holes 4, the surface of the base plate 2 has the elastic sealing film fixed thereto and is thereby protected from cooling water. An elastic sealing material equal in height to the beads may be fixed to encircle the inner peripheral edge of each cooling water hole 4.

It is obvious from the foregoing, assuming that the metallic gasket 1 is used in an internal combustion engine of an overboard motor, for example, salt water is often used as cooling water in an outboard engine, when stainless steel is used for the gasket, it is susceptible to potential difference corrosion by cooling water, and when soft steel is used, it is liable to salt-water corrosion. However, when a metallic gasket 1 according to this embodiment is used and the bead structure and the elastic sealing material layout described above are adopted, even if less-expensive soft steel is used for cost reduction, salt water is sealed off, thus preventing salt-water corrosion and improving rust-preventive effects, and making it possible to prevent flange vibration amplitude, concurrent deformation by heat, and a decrease in fastening axial tension. Further, when aluminum is used for the base plate 2, there is no need to worry about salt-water corrosion, the elasticity can be obtained by the elastic sealing material 12, 13 filled in the concave portion of the convex full beads 6, 7 and by the elastic sealing material parts formed in the convex portion, and the sealing property can be secured by the elastic sealing material 8a, 9a, 10a, and 11a formed in the range in which the beads are covered.

Figure 4:
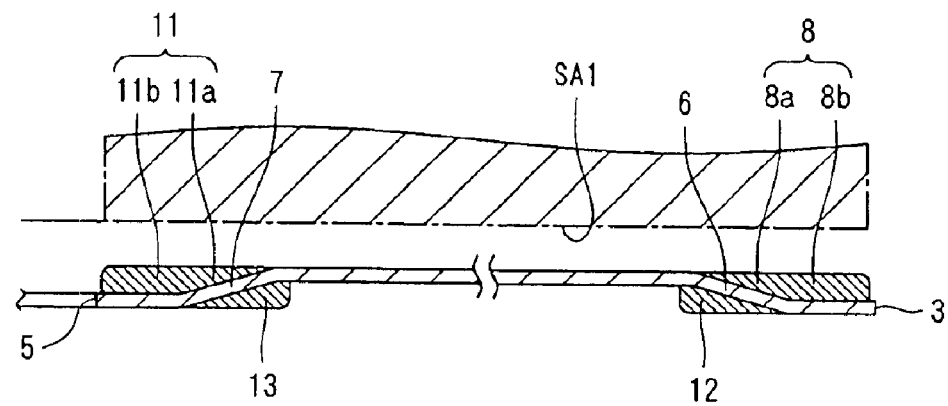
FIG. 4 is a sectional view taken along the line B—B for explaining a bead in a raised shape formed using half beads.

Though the full beads 6, 7 as the convex type bead are illustrated in the above embodiment, it is possible to adopt stepped half beads 6, 7 as shown in FIG. 4 where the seal area is narrow. In FIG. 4, the upper surface of the inclined portion serves as the convex side surface of the bead, and the lower surface of the inclined portion serves as the concave side surface, the height of the upper side elastic sealing material 8, 11 is equal to the height of the bead, and the lower side elastic sealing material 12, 13 are filled in up to the bottom surface. The operation and the effects are the same as described above.

A second embodiment of the present invention will be described with reference to drawings. Those parts of the second embodiment which are identical with those of the first embodiment are designated by the same reference numerals.

Figure 5:
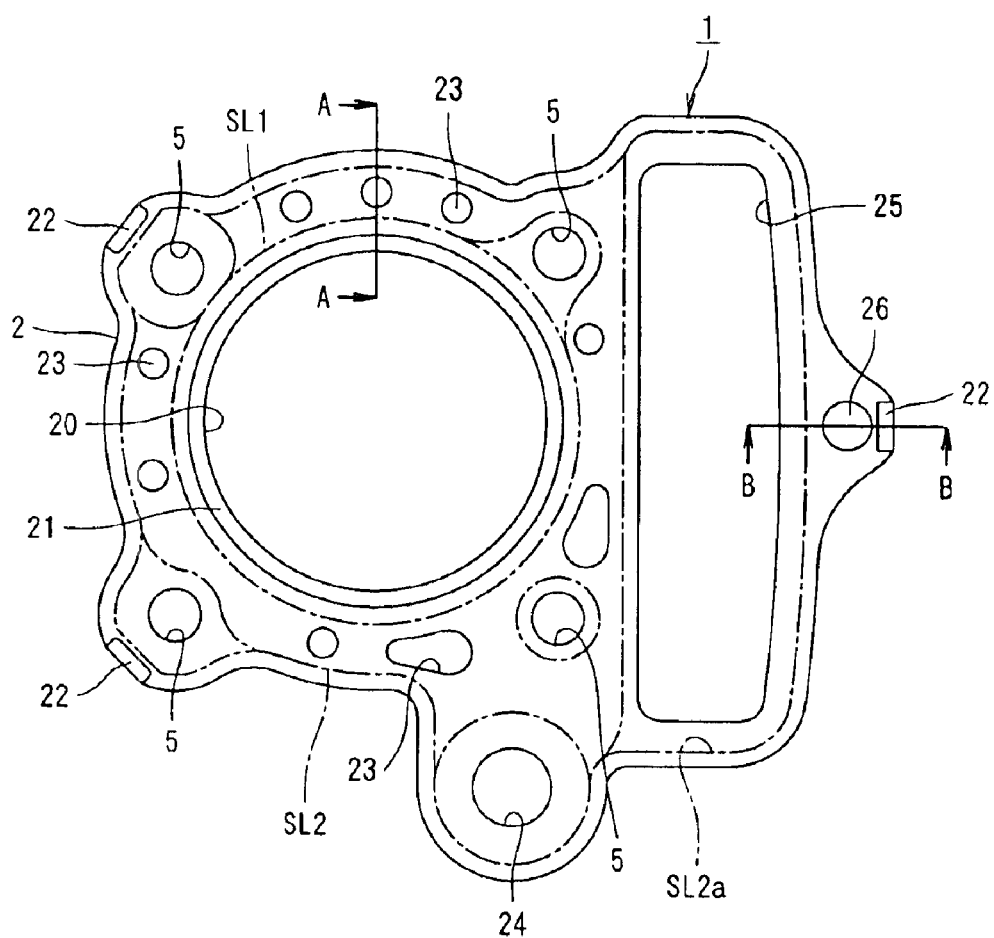
FIG. 5 is a plan view for explaining a metallic gasket according to a second embodiment of the present invention.
Figure 6:
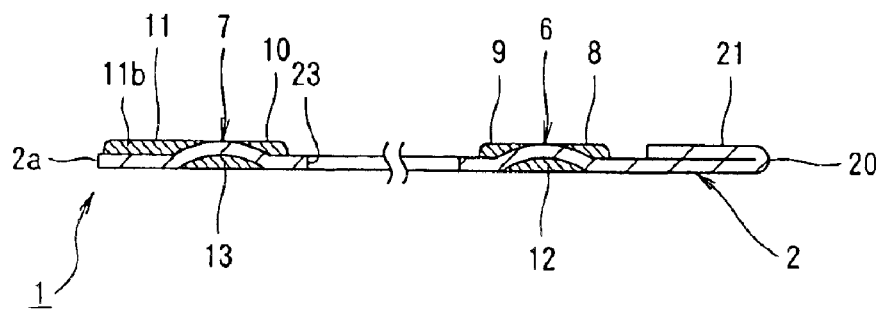
FIG. 6 is a sectional view taken along the line A—A in FIG. 5.

FIG. 5 is a plan view for explaining a metallic gasket 1 according to the second embodiment. FIG. 6 is a sectional view taken along the line A—A in FIG. 5.

Figure 7:
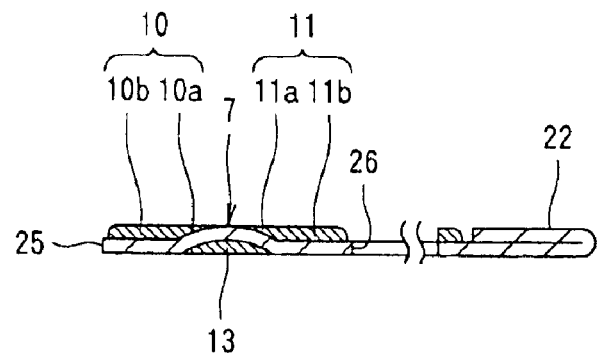
FIG. 7 is a sectional view taken along the line B—B in FIG. 5.
Figure 8:
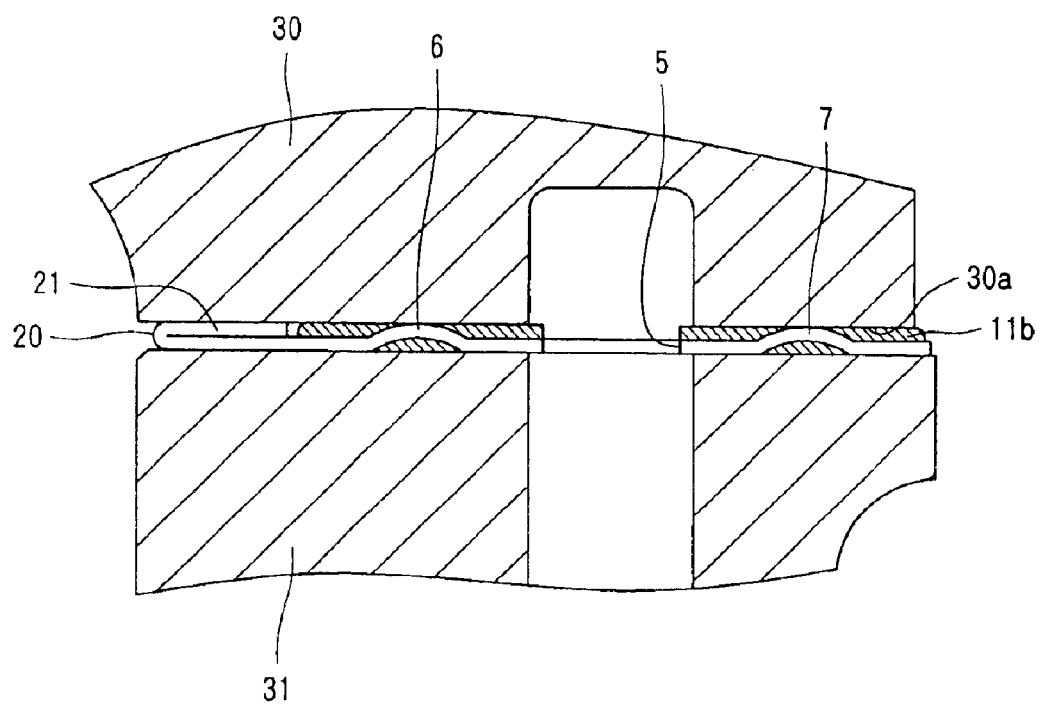
FIG. 8 is a sectional view showing an engine in which a metallic gasket according to a second embodiment of the present invention is mounted.
Figure 9:
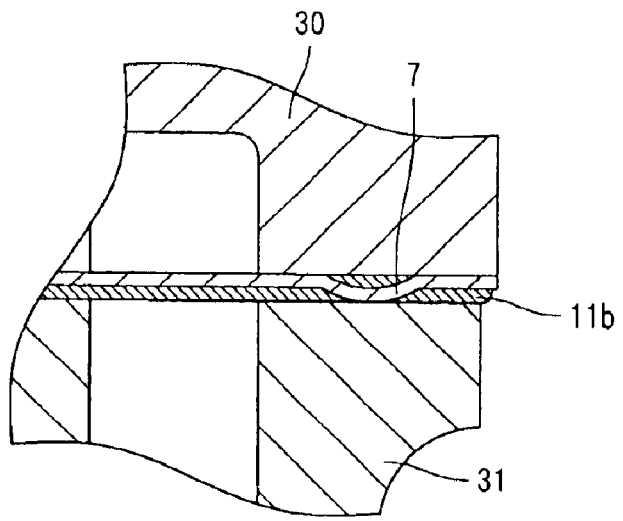
FIG. 9 is another sectional view showing an engine in which a metallic gasket according to a second embodiment of the present invention is mounted.

FIG. 7 is a sectional view taken along the line B—B in FIG. 5. FIGS. 8 and 9 show two cases where a metallic gasket according to the second embodiment is mounted in the engine.

The metallic gasket according to the second embodiment is a gasket which is interposed between a cylinder block and a cylinder head.

Description will start with its structure.

As the base plate 2 of the metallic gasket 1 according to the second embodiment, it is possible to show cases that the metal plate is stainless steel or soft steel. Here, suppose that soft steel is used with a view to providing a less expensive gasket.

The base plate 2 has a combustion chamber opening 20 provided and a first thickness-increased portion 21 with the greatest thickest formed by upwardly folding back the inner peripheral edge portion of the combustion chamber opening 20, thereby providing a difference in thickness from the remaining portions of the base plate. A second thickness-increased portion 22 is formed by upwardly folding back a part of the outer peripheral edge of the base plate 2. The second thickness-increased portion 22 is made thinner than the first thickness-increased portion 21 by forging, for example. The folded portion of the first thickness-increased portion 21 of the base plate 2 is varied (inflected) in thickness along the peripheral portion of the combustion chamber opening 20 in such a way that the folded portion in the neighborhood of a bolt hole 5, which will be described later, is made a thin portion and the folded portion in the region between the bolts 5 is made a thick portion. The total thickness of the thin portion of the first thickness-increased portion 21 is thicker than the total thickness of the second thickness-increased portion 22.

A first seal line SL1 is provided in a manner to endlessly encircle the first thickness-increased portion 21 of the base plate 2. Holes, such as water holes 23, an oil hole 24 and a chain chamber hole 25, are formed on the outer side of the first seal line SL1. A second seal line SL2 is provided to extend along the outer peripheral edge of the base plate 2 and also to surround the holes, such as the chain chamber hole 25. Reference numeral 26 denotes a bolt hole on the outer side of the second seal line SL2.

As shown in FIGS. 6 and 7, convex cross-section full beads 6, 7 are formed by bending the base plate in a manner to extend along the first and second seal lines SL1 and SL2.

Elastic sealing material 8 to 11, made of a rubber material, such as fluororubber, NBR and silicon rubber, a resin material, or the like, are fixed to the surface of the base plate 2 on the convex side of the full beads 6, 7, and like elastic sealing material 12, 13 are filled in the concave portions located on the reverse side of the convex portions of the full beads 6, 7.

The elastic sealing material 8 to 11 fixed to the convex side of the full beads 6, 7 are fixed to the surface of the base plate 2 at least to cover both sides across the width of the full beads 6, 7. Note that out of the elastic sealing material 8 to 11 provided on the convex side of the beads 6, 7, the sealing material 11 on the outer peripheral portion of the full bead 7 formed along the outer edge 2a of the base plate 2 is fixed up to the outer edge 2a of the base plate 2, and also fixed to the surface of the flat portion of the base plate 2 continuous to the surface of the convex portion, while the elastic sealing material 11b fixed to the surface of the flat portion can face the outer peripheral edge portion of the opposing joint surface.

In this embodiment, the outer edge 2a of the base plate 2 is made to extend beyond the outer peripheral edge of the above-mentioned joint surface to thereby absorb the forming error of the elastic sealing material 11 that occurs during molding, with the result that the elastic sealing material 11b can be securely positioned in a face-to-face relation with the outer edge of the corresponding joint surface.

Out of the elastic sealing material parts provided on the convex portion sides of the beads 6, 7, in the region where the seal line SL2a is formed surrounding the peripheral edge portion of the hole, such as the chain chamber hole 25, the elastic sealing material for the inner peripheral edge side of the full bead 7 is fixed to the flat surface of the base plate 2 continuous to the surface of the convex portion, that is, up to the inner peripheral edge of the chain chamber hole 25 so that the elastic sealing material fixed to the above-mentioned flat surface can face the inner peripheral edge portion of the corresponding hole on the opposing joint surface.

The height of the elastic sealing material 8 to 11 fixed to the convex portion side of the full beads 6, 7 is made equal to or substantially equal to the height of the convex portions of the full beads 6, 7, and the upper surface of the elastic sealing material parts is made substantially parallel with the flat surface of the base plate 2.

On the other hand, the filled amounts of the elastic sealing material 12, 13 filled in the concave portions of the full beads 6, 7 are made substantially equal to the capacities of the concave portions, and their surfaces are made substantially flush with the flat surface of the base plate 2.

When a metallic gasket 1 structured as described is disposed between the opposing joint surfaces of a cylinder block 30 and a cylinder head 31 and fastened with clamping bolts, the elastic sealing material 8 to 11 fixed to the convex portions of the full beads 6, 7 and the elastic sealing material 12, 13 filled in the concave portions are compressed and deformed in the through-thickness direction in cooperation with the full beads 6, 7, and at the end of fastening, the greatest surface pressure concentrates on and the largest load acts on the first thickness-increased portion 21 due to a difference in thickness between the first thickness-increased portion 21 with the greatest thickness of the base plate 2 and the remaining portions.

Therefore, a threefold seal is applied, which comprises the largest surface pressure at the first thickness-increased portion 21 and the elastic resiliences of the two lines of full beads 6, 7 (including the elastic sealing material parts on the convex and concave portions), and simultaneously the stopper effect of the first thickness-increased portion 21 prevents total collapse of the elastic sealing material 8, 9 and 12 fixed to the convex side and filled in the concave side of the full bead 6, and on the other hand, the stopper effect of the second thickness-increased portion 22 prevents total collapse of the elastic sealing material 10, 11 and 13 fixed to the convex side and filled in the concave side of the full bead 7.

Also in the metallic gasket 1 structured as described, since the elastic sealing material 8 to 11 are fixed to the convex portions and filled in the concave portions of the full beads 6, 7, the elastic sealing material that protrudes from the base plate 2 in the through-thickness direction is the elastic sealing material only on the convex side of the full beads 6, 7, in other words, only on one side of the base plate 2.

Figure 13:
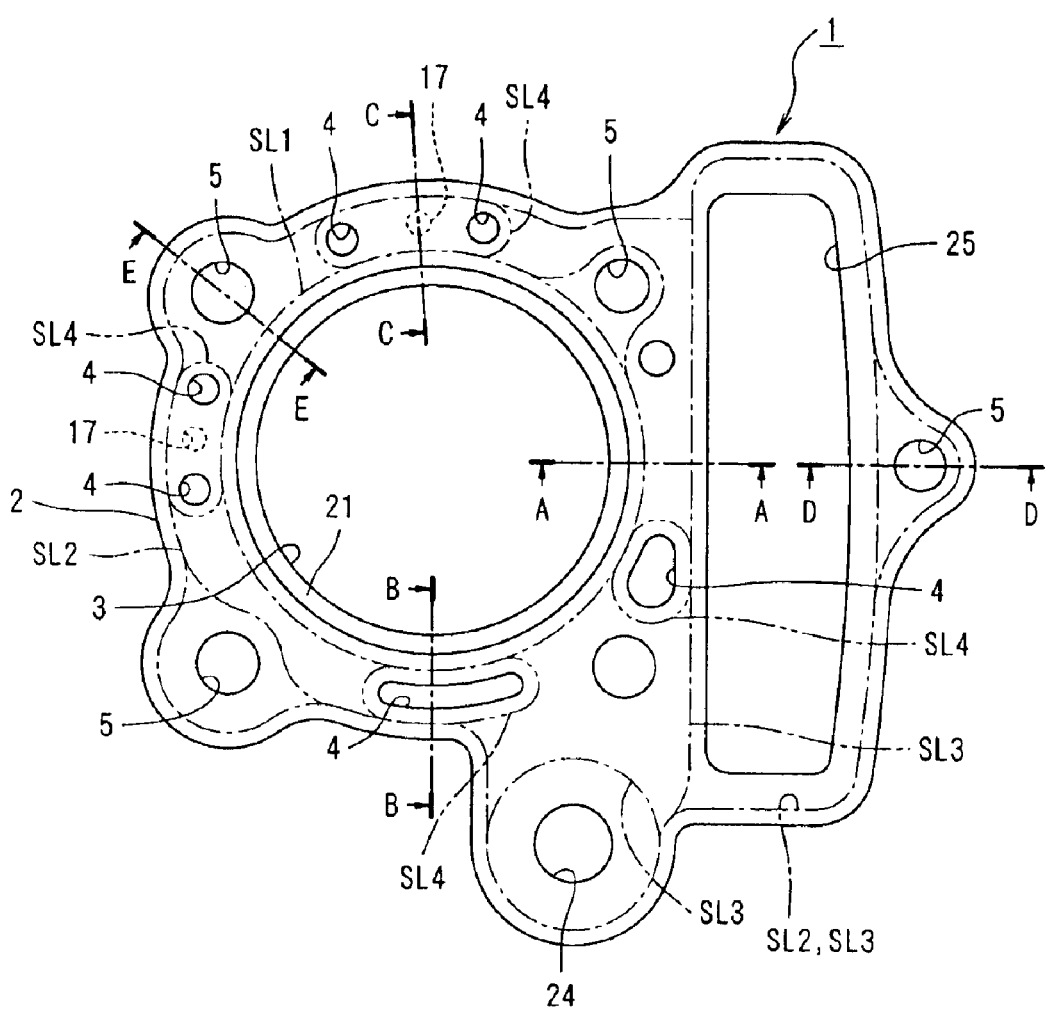
FIG. 13 is a plan view for explaining a metallic gasket according to a third embodiment of the present invention.

Therefore, the height of the elastic sealing material 8 to 11 fixed to the convex portions of the full beads 6, 7, for example, is t0+the compression-deformed amount (t0 ≒0.4 (40% max.), if the thickness of the folded-back portion of the base plate 2 at the first thickness-increased portion 21 is designated as t0, and assuming that t0 is 0.5 mm, the height of the rubber bead is 0.7 mm from the above equation, which is twice as high as in prior art shown in FIG. 13

Therefore, the elastic sealing material 8 to 11 on the convex side of the full beads 6, 7 become large in quantity, which results in an increase in the compression-deformed amount, making it easy to perform a forming process of the elastic sealing material parts, and making it possible to increase the thickness of the elastic sealing material parts, so that it becomes possible to set a large forming process tolerance and reduce manufacturing cost.

Further, the elastic sealing material 8 to 11 fixed to both sides across the width the convex portions of the full beads 6, 7 are exposed to cooling water only at the areas facing the water hole 23 side. On the other hand, the elastic sealing material parts filled in the concave portions of the full beads 6, 7 are covered with the full beads 6, 7 and are not exposed to cooling water, for which reason the elastic sealing material parts are protected from deterioration and therefore can maintain a stable seal performance for an extended period of time.

Further, a required sealing pressure is obtained by synergy of the resilience of the full beads 6, 7 and the elastic resilience of the elastic sealing material 8 to 13 fixed to the convex portion side and filled in the concave portion side of the full beads 6, 7, a fact which makes it possible to decrease the hardness of the base plate 2, eliminate worries about fatigue failure of the beads 6, 7 of the base plate 2, absorb the engine vibration amplitude and the seal area roughness as well, and thereby seal off cooling water pressure and oil pressure with less surface pressure.

Further, since a wide sealing area can be secured for the elastic sealing material 8 to 11 on the convex portion side of the full beads 6, 7 and also for the elastic sealing material 12, 13 on the concave portion side of the full beads 6, 7, the flaws on the joint surfaces and the blowholes that occur during casting and the working surface roughness can be sealed satisfactorily with a low pressure. Furthermore, since the elastic sealing material 8 to 13 consist of an elastic substance (rubber-based material, above all), the gasket factor is low, and therefore a limited axial load can be utilized effectively in the areas under adverse condition, s that total load can be decreased.

Further, the first thickness-increased portion 21 of the base plate 2 is made a thin web area in the vicinity of the bolt holes 5, but it is made a thick web area between the bolt holes 5 such that the resilience of the first thickness-increased portion 21 during fastening the bolts is weak in the vicinity of clamping bolts whose fastening force is large, but the resilience is stronger in the region between the clamping bolts whose fastening force is relatively small. Consequently, the surface pressure applied to the first thickness-increased portion 21 can be equalized in the circumferential direction of the combustion chamber opening 20 and the axial tension of the clamping bolts can be decreased, thus making it possible to effectively prevent deformation of the engine, especially, engines of low rigidity.

In recent engines, improvements have been made in downsizing, weight saving and performance, and as lean fuel is burned for energy conservation, combustion chamber temperature has risen. To seal off high pressure gas, a high surface pressure is generated by providing the first thickness-increased portion 21 formed by folding back the inner peripheral edge on the combustion chamber opening 20 side of the base plate as mentioned above. In this embodiment, by varying the thickness in the circumferential direction of the first thickness-increased portion 21, the fastening surface pressure along the peripheral portion of the hole for the combustion chamber opening is equalized, thereby improving the efficiency of sealing a combustion gas.

In this embodiment, convex cross-section beads 6, 7 are provided if necessary in a manner to surround the first thickness-increased portion 21 in the peripheral portion of the combustion chamber opening 20 and also surrounding the oil hole 24, water holes 23, bolt holes 5 and a chain chamber hole 25. With the convex cross-section beads 6, 7, the bead height or the bead width may be varied according to the rigidity of the joint surfaces at positions of contact to equalize the sealing pressure along the seal lines to thereby improve the seal efficiency. The sealing pressure can be equalized more easily by raising the bead height or widening the bead width at positions where the rigidity is insufficient and the surface pressure is weak.

As shown in the sectional view of FIG. 8 showing the gasket which is mounted, by fixing an elastic sealing material 11b to the surface of the base plate 2 on the convex side, excluding the folded-back portion (the second thickness-increased portion 22 ) at the outer peripheral edge, the elastic sealing material 11b, when compressed, is made to contact the outer peripheral edge of the opposing joint surface 30a to prevent filthy water or salt water or the like from entering from the outer peripheral end portion. More specifically, the base plate 2 is made to extend beyond the joint surface 30a of the cylinder head 30 and, further, the elastic sealing material provided on the outer side of the convex portion of the bead, at which a gap occurs, is also made to protrude from the seal area to thereby prevent infiltration of filthy water, salt water or the like. FIG. 9 shows a case where the beads 6, 7 are provided with their convex side facing downward.

As shown in FIGS. 8 and 9, out of the opposing joint surfaces, the joint surface on the smaller external profile side and the surface of the base plate 2 on the convex side of the bead should preferably be designed such that they face each other.

Figure 10:
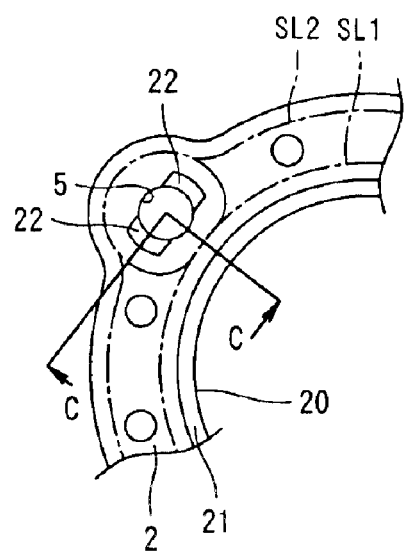
FIG. 10 is a plan view for explaining a second thickness-increased portion formed in one of bolt holes.
Figure 11:
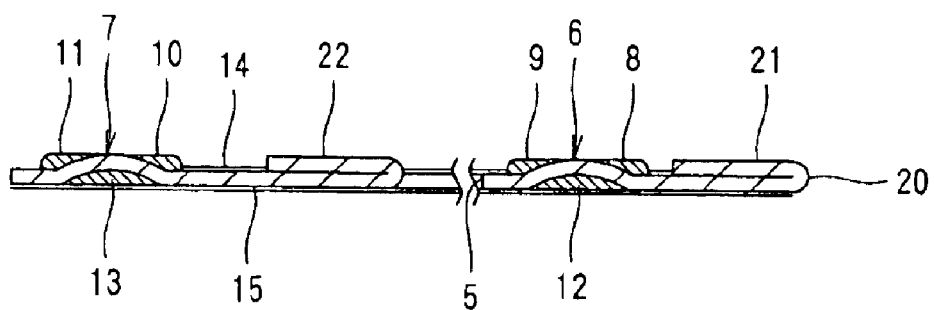
FIG. 11 is a sectional view taken along the line C—C in FIG. 10.
Figure 12:
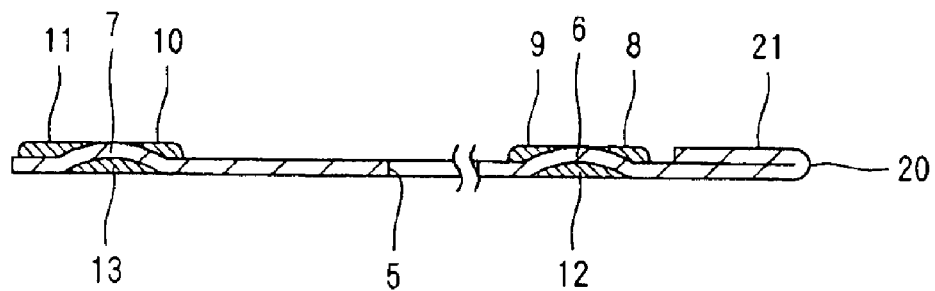

FIG. 10 shows a case where the second thickness-increased portion 22 to regulate the compression-deformed amount of the elastic sealing material is formed by folding back a part of the inner peripheral portion of the opening, such as a bolt hole 5 or an oil hole 6, instead of outer peripheral portion of the base plate 2. In this case, as shown in the sectional view taken along the line C—C in FIG. 11, it is possible to prevent corrosion of the base plate 2 by forming thin elastic sealing films 14, 15 in the regions, excluding the elastic sealing material parts and the folded-back portions of the first thickness-increased portion 21 and the second thickness-increased portion 22. Further, as shown in FIG. 12, it is possible to fix an elastic sealing material for the convex side of the bead to the flat surface of the base plate 2 on the bead 7 side along the second seal line SL2 to increase the area of the elastic sealing material, thereby getting rid of the second thickness-increased portion 22, formed by folding back, which is provided at a bolt hole 5, oil hole 6, or the like.

The structure of the metallic gasket 1 according to the present invention is not limited to the above-mentioned embodiment, but may be changed with proper discretion without departing from the scope and the spirit of the invention.

For example, in the embodiment mentioned above, the second thickness-increased portion 22 is made thinner by forging after folding back the edge portion of the on the outer peripheral side of the base plate 2. As an alternative for this, for example, the second thickness-increased portion 22 may be formed by attaching, by welding for example, a shim plate thinner than the base plate 2 to the outer peripheral region of the base plate 2 to thereby omit the above-mentioned forging of the second thickness-increased portion 22. Further, a shim plate may be included in the folded portion of the first thickness-increased portion 21 to thereby omit the forming of the second thickness-increased portion 22.

Further, in the embodiment mentioned above, the first thickness-increased portion 21 is formed by folding back the inner peripheral end portion on the combustion chamber opening 20 side of the base plate 2, but as an alternative for this, the first thickness-increased portion 21 may be formed by attaching a shim plate substantially equal in thickness to the base plate 2 to the end portion on the combustion chamber opening 20 side of the base plate 2 by welding, for example. Or, the first thickness-increased portion 21 may be formed by fitting a grommet over the end portion on the combustion chamber opening 20 side of the base plate, or by fitting a grommet over the end portion on the combustion chamber opening 20 side of the base plate 2 through the intermediary of an elastic plate, or by attaching shim plates formed as the full beads 6, 7 to the end portion on the combustion chamber opening 20 side of the base plate 2 by welding, for example.

Further, in the second embodiment, description has been made of an example that the full beads 6, 7 formed on the outer side of the first thickness-increased portion 21 of the base plate 2 and the full beads 6, 7 are formed on the inner side of the second thickness-increased portion 22 of the base plate 2. Then, the elastic sealing material is fixed to the convex portions and is filled in the concave portions of the full beads 6, 7. However, this is not intended as a definition of the limits of the invention, and on the inner side of the second thickness-increased portion 22 of the base plate 2, in place of the full beads 6, 7, half beads each in a stepped structure may be formed by bending the base plate 2, and an elastic sealing material may be fixed to the convex portions and filled in the concave portions of the half beads. Further, on the outer side of the first thickness-increased portion 21 of the base plate 2, in place of the full beads 6, 7, half beads each in a stepped structure may be formed by bending the base plate 2, and an elastic sealing material may be fixed to the convex portions and filled in the concave portions of the half beads.

The elastic sealing material filled in the concave portions of the half beads is so formed as to be substantially flush with the flat surface of the base plate 2, and therefore the elastic sealing material is not exposed to cooling water, but the elastic sealing material fixed to the convex portions protrudes from the flat surface of the base plate 2 and is directly exposed to cooling water. In this case, by providing the elastic sealing material fixed to the convex portions with a wide width, the elastic sealing material in its entirety can be prevented from deteriorating, thereby ensuring its superior sealing performance.

Further, in the embodiment mentioned above, the height of the convex portions of the full beads 6, 7 is made a little higher than the first thickness-increased portion 21 and substantially equal to the height of the elastic sealing material fixed to the convex portions, and the height of the convex portions of the full beads 6, 7 is made a little higher than the second thickness-increased portion 22. However, these are not necessarily required, and for example, the height of the convex portions of the full beads 6, 7 may be made a little lower than the first thickness-increased portion 21 so that the full beads 6, 7 are embedded in the elastic sealing material, and though this is not shown graphically, the convex portions of the full beads 6, 7 may protrude from the elastic sealing material. The same applies to the half beads, too.

Further, in the embodiment mentioned above, the surface of the elastic sealing material fixed to the convex portion side of the full beads 6, 7 or the half beads is made substantially parallel with the flat surface of the base plate 2, but this is not necessarily required, and as long as the elastic sealing material can be compressed and deformed in cooperation with the beads, various shapes may be adopted for the elastic sealing material.

Further, in the embodiment mentioned above, the elastic sealing material filled in the concave portions of the full beads 6, 7 or the half beads is made substantially flush with the flat surface of the base plate 2, but as long as the elastic sealing material is compressed and deformed in the through-thickness direction in cooperation with the beads, the elastic sealing material may have a somewhat rough surface with respect to the flat surface of the base plate 2. For example, the elastic sealing material filled in the concave portion side of the full beads 6, 7 may have a groove formed therein to permit the elastic sealing material to deform easily.

Further, in the embodiment mentioned above, description has been made of a case where the elastic sealing material fixed to the convex portion side of the full beads 6, 7 is disposed on both sides across the width of the convex portion, but this arrangement is not intended as a definition of the limits of the invention. For example, the elastic sealing material fixed to the convex portion side of the full beads 6, 7 may be arranged only on the combustion chamber opening 20 side of the width of the convex portion. By this arrangement, the elastic sealing material (rubber, for example) on the convex portion side is prevented from being exposed to cooling water or oil, which leads to better durability, and this structure is most suitable when the full beads 6, 7 are close to bolt holes 5 or water holes 23. The width of the beads may be varied in the circumferential direction to adjust the surface pressure.

Further, in each of the embodiments mentioned above, the elastic sealing material has been filled in the concave portions of the beads 6, 7 so as to be substantially flush with the flat surface of the base plate before the cylinder block and so on are fastened together with clamping bolts. However, alternatively, it is possible to fill the concave portions of the full beads 6, 7 with an elastic sealing material in an amount substantially equal to the capacities of the concave portions, and arrange for the elastic sealing material in the concave portions to be compressed and deformed so as to be substantially flush with the flat surface of the base plate 2 when the engine is assembled by fastening with clamping bolts.

A lubricant, such as molybdenum disulfide, which provides sealing and sliding properties, may be applied to one or both surfaces of the base plate 2 to prevent fretting caused by a displacement or knocking by a thermal expansion difference between the engine and the gasket or vibration amplitude.

A third embodiment of the present invention will be described with reference to the drawings.

Figure 14:
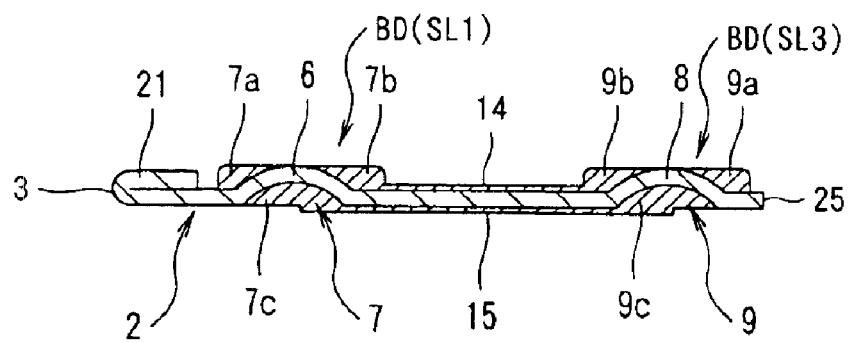
FIG. 14 is a sectional view taken along the line A—A in FIG. 13.
Figure 15:
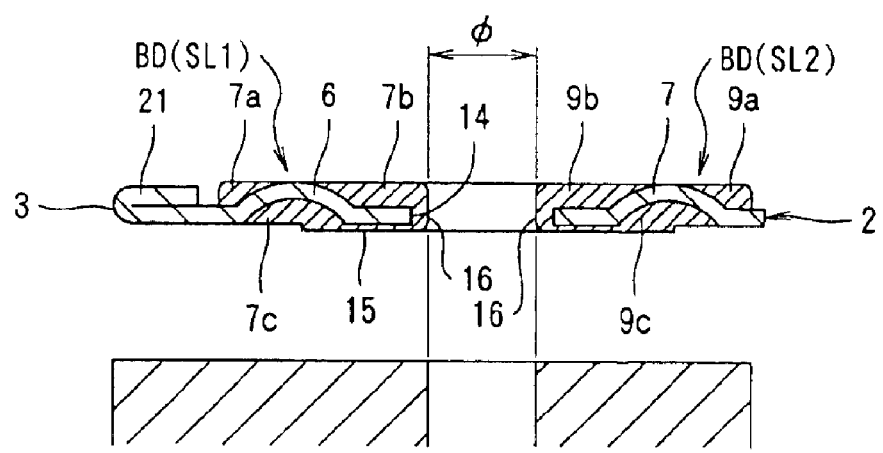
FIG. 15 is a sectional view taken along the line B—B in FIG. 13.
Figure 16:
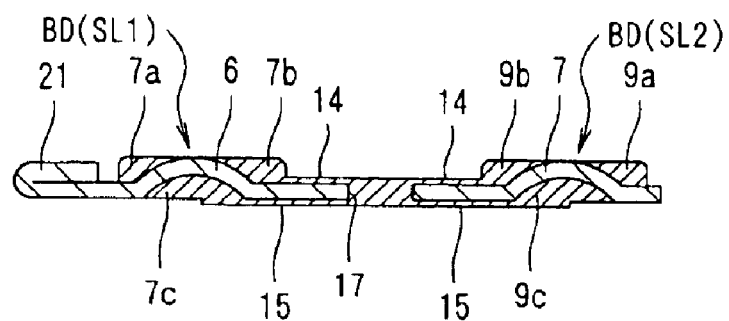
FIG. 16 is a sectional view taken along the line C—C in FIG. 13.
Figure 17:
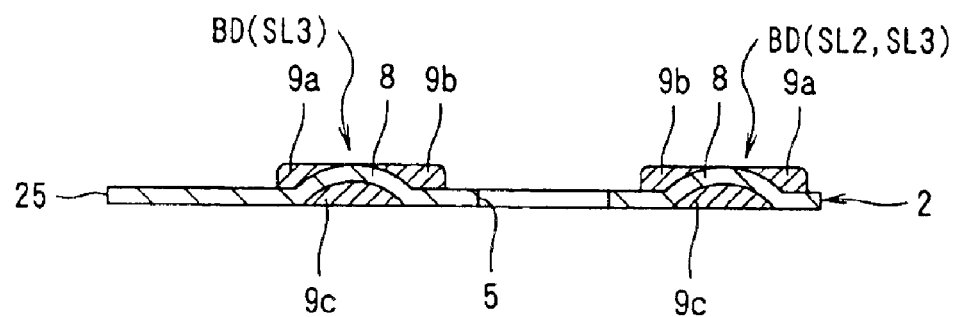
FIG. 17 is a sectional view taken along the line D—D in FIG. 13.
Figure 18:
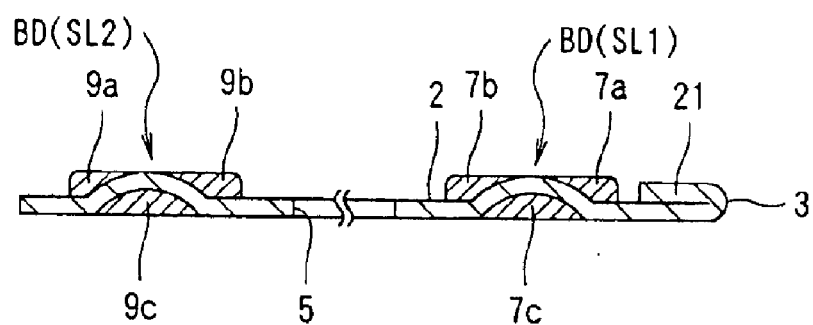
FIG. 18 is a sectional view taken along the line E—E in FIG. 13.

FIG. 13 is a plan view for explaining a metallic gasket according to the third embodiment of the present invention. FIG. 14 is a sectional view taken along the line A—A in FIG. 13. FIG. 15 is a sectional view taken along the line B—B in FIG. 1. FIG. 16 is a sectional view taken along the line C—C in FIG. 1. FIG. 17 is a sectional view taken along the line D—D in FIG. 13. FIG. 18 is a sectional view taken along the line E—E in FIG. 13.

Description will be made of a metallic gasket according to the third embodiment.

The metallic gasket 1 according to the third embodiment is an example of a gasket sandwiched between the joint surfaces of the cylinder head and the cylinder block of an internal combustion engine. As the base plate 2 of the metallic gasket 1, it is possible to cite thin metal plate, such as stainless steel, soft steel, or aluminum, but description will be made on the assumption that soft steel plate is used to provide a less expensive gasket. If thin metal plate of low rigidity, such as soft steel plate is used for the base plate 2, a sufficient seal performance can be obtained, as described later.

Almost in the middle of the base plate 2, there is formed a large combustion chamber openings 3 located at a position corresponding to the combustion chamber bore where a combustion gas is made to explode. A first thickness-increased portion 21 with the largest thickness is formed by upwardly folding back the whole inner peripheral edge of the base plate at the open tip of the combustion chamber opening 3, and by this folded-back portion, a difference in thickness with the remaining portions of the gasket is provided. Designed to generate a largest surface pressure when its main part made of metal is mounted between the joint surfaces, the first thickness-increased portion 21 is capable of sufficiently sealing a combustion gas with the highest of pressures to be contained. Note that the formation of the first thickness-increased portion 21 is not limited to folding back the metal plate as mentioned above, but it is possible make it by using a grommet as in prior art. The thickness of the folded-back portion of the first thickness-increased portion 21 is planned to equalize the sealing face pressure borne by the first thickness-increased portion formed in the circumferential direction by varying (inflecting) its thickness in its extending direction along the circumferential direction of the combustion chamber opening 3 by forming a thin web region relatively thinner than the vicinity of the bolt holes 5 and a thick web region between the bolt holes 5.

In a metallic gasket for a multicylindered engine, a second thickness-increased portion is often formed by locally folding back the edge portion of the outer periphery of the base plate 2. In this third embodiment, however, since the gasket is for use in a single cylinder, the fastening bolt axial tension is small and the distance from the combustion chamber opening 3 to the peripheral edge portion is short; therefore, the second thickness-increased portion is formed of a wide-width rubber bead as a substitute for the second thickness-increased portion made of metal as will be described later. Needless to say, the second thickness-increased portion of metal plate may be used.

A first seal line SL1 is provided in a manner to endlessly encircle the first thickness-increased portion 21 of the base plate 2. On the outer side of the first seal line SL1, there are formed the water holes 4, oil hole 24, and chain chamber hole 25. A second seal line SL2 is set along the outer peripheral edge of the base plate 2, and a third seal line SL3 is set in a manner to surround the chain chamber hole 25 and the oil hole 24. Moreover, a fourth seal line SL4 is set in a manner to surround the water holes 4 as the liquid holes. The fourth seal line SL4 encircling the water hole 4 is arranged in some place to surround a plurality of water holes with a single seal line. The overlapping portions of seal lines which are close to each other or run in parallel are combined into a single line.

A bead BD is formed along all seal lines SL1 to SL4. The bead BD according to this embodiment is a composite bead of a metal bead 6 or 8 and a rubber bead 7 or 9 as shown in FIG. 14, for example.

The metal beads 6, 8 are full beads formed by bending the base plate 2 so as to protrude to one surface side (upper surface) of the base plate 2, and the height of the beads is set so as to be higher than the first thickness-increased portion 21, and the bead generates a sealing pressure as it is deformed in the through-thickness direction.

The rubber bead 7 or 9 comprises elastic sealing material 7a, 7b or 9a, 9b fixed to the surface of the convex portion side of the base plate 2 of the metal bead 6 or 8, and elastic sealing material 7c or 9c filled in the concave portion on the reverse side of the convex portion of the metal bead 6 or 8. The elastic sealing material may be composed of a corrosion-resistant and elastic material, i.e., a rubber material, such as fluororubber, NBR or silicon rubber, or a resin material or the like.

Figure 19:
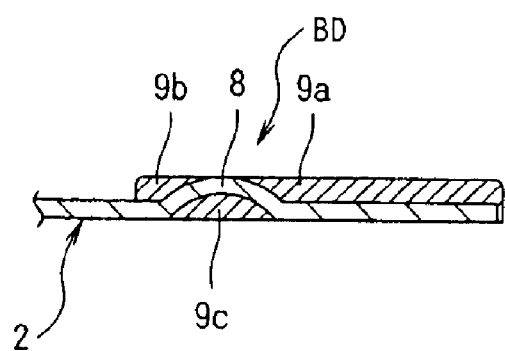
FIG. 19 is a sectional view showing a case where the second thickness-increased portion is replaced by a rubber bead.

The elastic sealing material 7a, 7b, 9a, and 9b arranged on the convex portion side of the metal beads 6, 8 are fixed to the surface of the base plate 2 in a manner to cover at least both sides across the width of the metal beads 6, 8. Some of the rubber beads 7, 9 formed along the outer peripheral edge of the base plate 2 are formed for a broad range to make them also serve as the second thickness-increased portion as shown in FIG. 19.

The height of the elastic sealing material 7a, 7b, 9a and 9b fixed to the convex portion side of the metal bead 6, 8 is made to be equal or substantially equal to the height of the convex portions of the metal beads 6, 8 and their top surface is made substantially parallel with the flat surface of the base plate 2. Note that the height of the above-mentioned elastic sealing material 7a, 7b, 9a, and 9b may be set to be a little higher than the height of the convex portions of the metal beads 6, 8 provided, however, that this height must be a height such that the compression-deformed amount regulated by the height of the first thickness-increased portion 21 is 35% or less (the known compression-deformed amount of a specific material, which does not give rise to buckling).

Meanwhile, the amount of the elastic sealing material 7c and 9c filled in the concave portions of the metal beads 6, 8 is made substantially equal to the capacities of the concave portions and their bottom surface is made substantially flush with the flat bottom surface of the base plate 2.

Thin films 14, 15 composed of the same material as that of the elastic sealing material 7a to 7c, 9a to 9c are fixed to the upper and lower surfaces of the base plate 2 along the seal line encircling at least the water holes 4 as shown in FIGS. 14 and 15, for example, and also another of the above-mentioned film 16 is formed on the inside peripheral surface (interior surface) of the water hole 4. As a result, that portion of the base plate 2 which is located on the inner side of the seal line encircling the water hole is completely covered with the rubber beads 7, 9 and the films 14, 15 and 16. In this process, in the elastic sealing material 7c or 9c filled in the concave portion, the height of the portion integral with the film 15 is set at the same height as the film 15 to secure better continuity with the film 15. In the portion shown in the sectional view taken along the line A—A, there are the films 14 and 15, but if the bead is provided in a manner to cover the whole vicinity of the water hole, those films are not required.

In the base plate 2 on the inner side of the seal line set so as to collectively enclose multiple water holes 4, a small hole 17 is formed which is open to both surfaces of the base plate 2, and as shown in FIG. 16, this hole 17 interconnects the films 14 and 15 covering both surfaces of the base plate to make it more difficult for the films 14 and 15 to separate from the base plate 2.

Here, it is possible to arrange the seal line encircling the water hole 4 so as to be closer to the peripheral edge of the water hole 4, and as shown in FIG. 15, arrange the elastic sealing material 7b, 9b located near the water hole 4 out of the elastic sealing material 7a, 7b, 9a and 9b on the convex portion side, in order for the sealing material parts 7b, 9b to cover the base plate up to the peripheral edge of the water hole 4.

When the film 16 is formed on the inside surface of the water hole 4, the diameter of the water hole 4 becomes smaller by the amount of the thickness of the film 16 as shown in FIG. 15.

Before the film is formed, the diameter of the water hole 4 in the gasket is set by deducting the amount of the film thickness of the films 14, 15 from the final diameter of a completed water hole on the assumption that the diameter of the water hole becomes equal to the diameter of the water hole in a cylinder head, for example, after the film is formed. By this arrangement, the water flow channel is prevented from becoming narrow locally at the position of the gasket.

Description will next be made of the operation and the effect of the metallic gasket mentioned above.

When a metallic gasket 1 structured as described is disposed between the opposing joint surfaces of a cylinder block and a cylinder head and fastened with clamping bolts, the elastic sealing material 7a, 7b, 9a, 9b and the elastic sealing material 7c, 9c that constitute the rubber beads 7, 9 are compressed and deformed in the through-thickness direction in cooperation with the metal beads 6, 8, and at the end of fastening, the largest surface pressure concentrates on and the largest load acts on the first thickness-increased portion 21 due to a difference in thickness between the first thickness-increased portion 21 with the largest thickness of the base plate 2 and the remaining portions.

Therefore, a threefold seal is applied, which chiefly comprises the largest surface pressure on the first thickness-increased portion 21, and the elastic resiliences of the beads BD (metal beads 6, 8 and rubber beads 7, 9 ), and simultaneously the stopper effect of the first thickness-increased portion 21 prevents total collapse of the elastic sealing material 7a to 7c and 9a to 9c fixed or filled on the convex portion side or on the concave portion side of the metal beads 6, 8, and the stopper effect of the second thickness-increased portion 22 prevents total collapse of the elastic sealing material 7a to 7c and 9a to 9c fixed or filled on the convex portion side or on the concave portion side of the metal beads 6, 8.

Further, since the water hole 4 is enclosed by the beads BD structured as described, cooling water is prevented from moving to the outer side of the beads BD.

In the metallic gasket 1 structured as described, too, since the elastic sealing material 7a, 7b, 9a, 9b are fixed to the convex portions of the metal beads 6, 8 and the like elastic sealing material 7c, 9c are filled in the concave portions of the metal beads 6, 8, the elastic sealing material 7a, 7b, 9a, 9b that protrude from the base plate 2 in the through-thickness direction is the elastic material parts only on the convex portion side of the metal beads 6, 8, in other words, on one side of the base plate 2.

Figure 25:
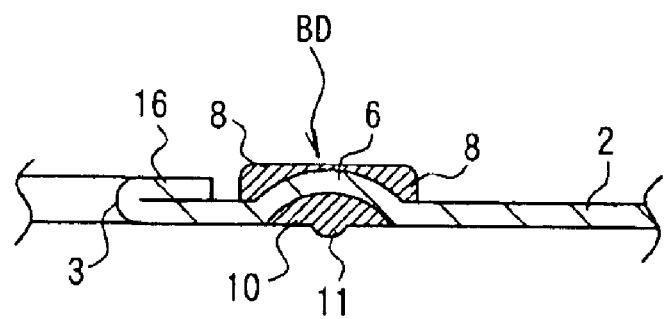
FIG. 25 is a sectional view showing a bead according to a fourth embodiment of the present invention.

Therefore, the height of the elastic sealing material 7a, 7b, 9a, 9b fixed to the convex portions of the metal beads 6, 8, for example, is (t0 t1)+the compression-deformed amount ((t0 t1) ⋝0.4 (40% max.)) if the thickness of the base plate 2 is designated as t1 and the thickness of the first thickness-increased portion 21 is designated as to, and assuming that t0 is 0.5 mm, the thickness of the base plate t1 is 0.25 mm (in this embodiment, the thickness ti of the base plate is set at ½ of to because the first thickness-increased portion 21 is formed by folding back the base plate 2.), the height of the rubber beads 7, 9 is 0.35 mm from the above equation, which is 1.7 times the value in prior art shown in FIG. 25.

Therefore, the elastic sealing material 7a, 7b, 9a, 9b on the convex portions of the metal beads 6, 8 increases in quantity, and their compression-deformed amounts become larger, making it easy to carry out a forming process of the elastic sealing material 7a, 7b, 9a, 9b, and making it possible to increase the thickness of the elastic sealing material 7a to 7c and 9a to 9c, so that it becomes possible to set a larger processing tolerance and reduce manufacturing cost.

Out of the elastic sealing material 7a, 7b, 9a, 9b fixed to both sides across the width of the convex portions of the metal beads 6, 8, only the parts 7b, 9b facing the water hole 4 are exposed to cooling water. On the other hand, the elastic sealing material 7c, 9c filled in the concave portions of the metal beads 6, 8 are covered with the metal beads 6, 8 and are not exposed to cooling water, for which reason the elastic sealing material 7a, 7c, 9a, 9c are protected from deterioration and therefore can maintain a stable seal performance for a long period of time.

In addition, since the whole surfaces (the upper and lower surfaces the base plate and the inside surface of the hole) of the base plate 2 within the seal line SL4 formed in a manner to surround the water hole 4 are covered with the corrosion-resistant films 14 and 15, the base plate 2 is prevented from being corroded even if a liquid likely to corrode the base plate 2 happens to flow through the water hole 4, such as substandard cooling water.

Further, a required sealing pressure is obtained by synergy of the resilience of the metal beads 6, 8 and the elastic resilience of the elastic sealing material 7a to 7c and 9a to 9c fixed to the convex portions or filled in the concave portions of the metal beads 6, 8, a fact which makes it possible to decrease the hardness of the base plate 2 itself, therefore eliminate worries about fatigue failure of the beads 6, 8 of the base plate 2, moreover absorb the engine vibration amplitude and the seal area roughness, and thereby sufficiently seal cooling water pressure and oil pressure with a lower surface pressure.

Further, since a wide sealing area can be secured for the elastic sealing material 7a, 7b, 9a, 9b on the convex portion side and also for the elastic sealing material 7c, 9c on the concave portion side of the metal beads 6, 8, in other words, since the portions of the gasket which serve as the area seal and contact the joint surfaces are made of rubber or a rubber-based material, the flaws and the blowholes as casting defects on the joint surfaces or the roughness of the processed surfaces can be sealed satisfactorily with a low surface pressure. In addition, since the elastic sealing material 7a to 7c and 9a to 9c consist of an elastic material (rubber-based, above all else), the gasket factor is low, and therefore a limited axial load can be utilized effectively in the regions under adverse condition, and total load can be decreased.

Further, the first thickness-increased portion 21 of the base plate 2 is made a thin web area in the vicinity of bolt holes 5, but it is made a thick web area between the bolt holes 5 such that the resilience of the first thickness-increased portion 21 is weak in the vicinity of clamping bolts whose fastening force is large; however, the resilience is stronger in the area between the clamping bolts whose fastening force is relatively small. Consequently, the surface pressure applied to the first thickness-increased portion 21 can be equalized in the circumferential direction of the combustion chamber opening 3, and the axial tension of the clamping bolts can be decreased, thus making it possible to satisfactorily prevent deformation of the engine, particularly in engines of low rigidity. Recently, progresses have been made to engines in terms of reductions in size and weight and high performance, and as lean fuel is burned for energy saving, combustion chamber temperature has risen. To seal a high pressure gas, a high surface pressure is generated by the first thickness-increased portion 21 which is formed by folding back the inner peripheral edge on the combustion chamber opening 3 side of the base plate as mentioned above. In this embodiment, by varying the thickness in the circumferential direction of the first thickness-increased portion 21, the fastening surface pressure along the peripheral portion of the opening for the combustion chamber bore is equalized, reducing oil consumption and power loss, thereby improving the efficiency of sealing a combustion gas.

In this embodiment, convex cross-section beads 6, 8 are provided if necessary in a manner to surround the first thickness-increased portion 21 in the peripheral portion of the combustion chamber opening 3 and also surrounding the oil hole 24, water holes 4, bolt holes 5 and a chain chamber hole 25. With the convex cross-section metal beads 6, 8, the bead height or the bead width may be varied according to the rigidity of the joint surfaces at positions of contact to equalize the sealing pressure along the seal lines to thereby improve the seal efficiency. The sealing pressure can be equalized more easily by raising the bead height or widening the bead width at positions where the rigidity is insufficient and the surface pressure is weak.

Figure 20:
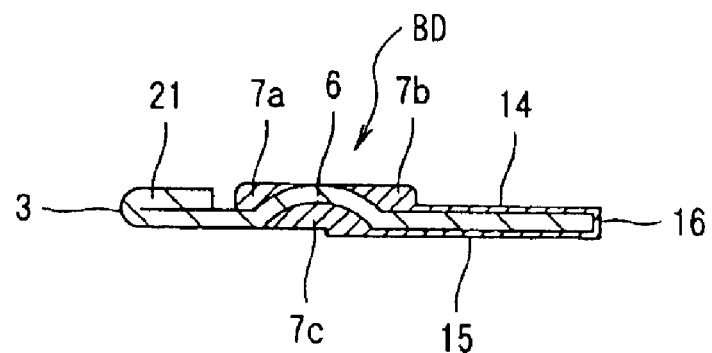
FIG. 20 shows a case where the edge portion along the outer periphery of the base plate is also covered.
Figure 21:
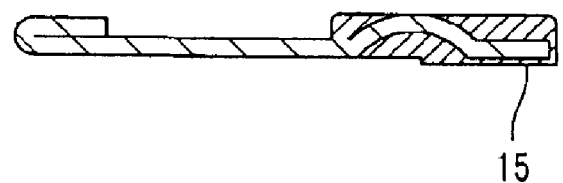
FIG. 21 shows a case where the edge portion along the outer periphery of the base plate is also covered.

Here, by forming films on the outer side of the bead BD as shown in FIGS. 20 and 21, which depict the outer peripheral edge, corrosion from contact with filthy water or salt water or the like is prevented.

The structure of the metallic gasket according to this invention is not limited to the above embodiment, but may be changed with proper discretion without departing from the scope and spirit of the invention.

Further, in the embodiment mentioned above, the first thickness-increased portion 21 is formed by folding back the inner peripheral end portion on the combustion chamber opening 3 side of the base plate 2, but as an alternative for this, the first thickness-increased portion 21 may be formed by attaching a shim plate substantially equal in thickness to the base plate 2 to the end portion on the combustion chamber opening 3 side of the base plate 2 by welding, for example. Or, the first thickness-increased portion 21 may be formed by fitting a grommet over the end portion on the combustion chamber opening 3 side of the base plate, or by fitting a grommet over the end portion on the combustion chamber opening 3 side of the base plate 2 through the intermediary of an elastic plate, or by attaching shim plates formed as the fall beads 6, 8 to the end portion on the combustion chamber opening 3 side of the base plate 2 by welding, for example.

Figure 22:
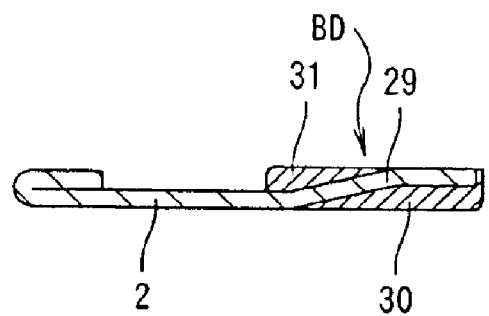
FIG. 22 shows a case where the metal bead is formed as a half bead in a raised shape.

Further, in place of the metal beads 6, 8 as full beads, metal beads 29 may be formed as half beads each in a stepped structure by bending the base plate 2 as shown in FIG. 22, and elastic sealing material 30, 31 may be fixed to the convex portion of or filled in the concave portion of each of the metal beads 29.

Here, since the elastic sealing material 30 filled in the concave portion of the metal bead 29 as a half bead has its bottom surface substantially flush with the flat bottom surface of the base plate 2, the elastic sealing material 30 is hardly exposed to cooling water. The elastic sealing material 31 fixed to the convex portion side extends in the through-thickness direction and is therefore directly exposed to cooling water. In this case, the width of the elastic sealing material 7a, 7b, 9a, 9b is widened to prevent deterioration of all of the sealing material parts 7a, 7b, 9a, 9b to thereby secure a satisfactory seal performance.

Further, in the embodiment mentioned above, the top surface of the elastic sealing material 7a, 7b, 9, 9b fixed to the convex portions of the metal beads 6, 8 is made substantially parallel with the flat surface of the base plate 2, but this is not necessarily required, and it is possible to adopt various shapes as long as the sealing material parts can be compressed and deformed in the through-thickness direction in cooperation with the metal beads 6, 8.

Further, in the embodiment mentioned above, the elastic sealing material 7c, 9c filled in the concave portions of the metal beads 6, 8 are made substantially flush with the flat surface of the base plate 2, but the elastic sealing material 7c, 9c may have a somewhat irregular surface with respect to the flat surface of the base plate 2 as long as the sealing material parts be compressed and deformed in the through-thickness direction in cooperation with the metal beads 6, 8. For example, a groove may be formed in the elastic sealing material 7c, 9c filled in the concave portion side of the metal beads 6, 8 to permit the sealing material parts 7c, 9c to deform easily.

Figure 23:
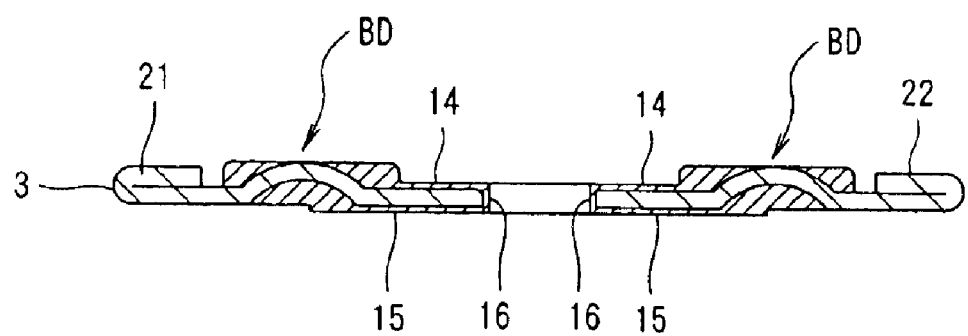
FIG. 23 shows a case where the second thickness-increased portion is formed by metal.
Figure 24:
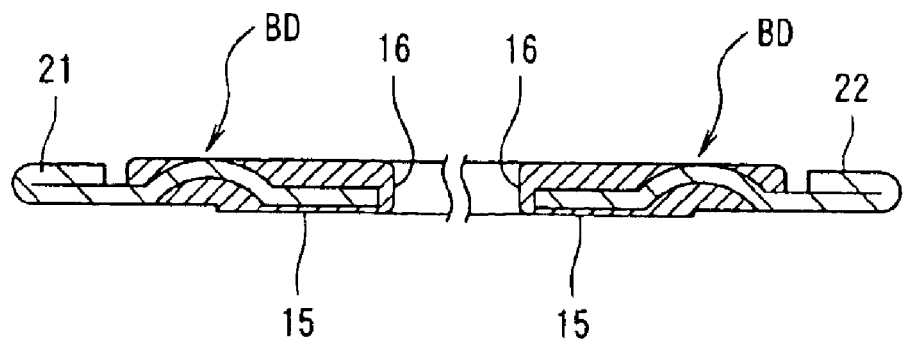
FIG. 24 shows a case where the second thickness-increased portion is formed by metal.

As shown in FIGS. 23 and 24, a second thickness-increased portion of metal may be formed by folding back a part of the outer peripheral edge of the base plate 2.

The elastic sealing material 7a to 7c, 9a to 9c, 30 and 31 that constitute the rubber beads mentioned above may be formed by fixing to the convex portion side or filling in the concave portion side of the beads 6, 8 of the base plate 2. For this purpose, passages (not shown) for a molding material may be formed in the metal beads 6, 8, for example, for simultaneous forming of the convex and concave portions.

The earlier-mentioned films may be formed by chromium plating, for example.

Though description is being made referring chiefly to a water-cooled engine, with an air-cooled engine, the bead line on the outer side of the first thickness-increased portion 21 can be done away with.

A fourth embodiment of the present invention will be described with reference to the drawings.

In the metallic gasket 1 according to the invention in the present application, the structure other than that of the beads along the seal lines are the same for each of the above-mentioned embodiments.

In other words, the beads are formed along the seal lines SL1 and SL2.

Figure 26:
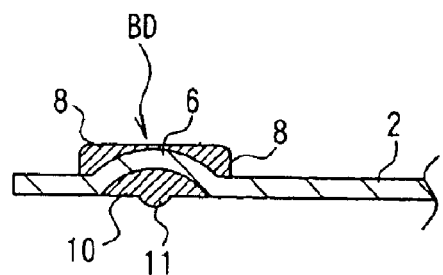
FIG. 26 is a sectional view showing a bead according to the fourth embodiment of the present invention.

As shown in FIGS. 25 and 26, the bead BD in this embodiment is a composite of one bead 6 made of the base plate as a full bead and one rubber bead 8 or 10.

The base-plate bead 6 is formed on the thickness-increased portion 16 side by bending the base plate 2 in the through-thickness direction and is in a convex form with a height higher than the thickness-increased portion 16.

The rubber bead is composed of a first elastic sealing material 10 filled in the concave portion of the base-plate bead 6 and a second elastic sealing material 8 fixed to the convex portion side of the base-plate bead 6.

The first elastic sealing material part is arranged so that the bottom surface is flat and substantially flush with the bottom surface of the base plate 2. In about the center in the width direction of the bead, a convex protrusion 11 is formed on its bottom surface in a manner to extend along the seal line SL1 or SL2.

The second elastic sealing material 8 is formed with a width slightly wider than the width of the base-plate bead 6 and on the surface of the convex portion of the bead and on the flat surface continuous to the convex portion. The second elastic sealing material 8 is designed so that its height is almost equal to the height of the base-plate bead 6 and the surface (the top surface) is substantially flat.

The width of the second elastic sealing material 8 is preferably not more than 1.5 times the width of the base-plate bead 6. If the width is increased excessively, load increases excessively. The height of the elastic sealing material 8 is preferably in the range of 0.9 to 1.1 times the height of the base-plate bead 6.

The number and the kinds of holes, such as the bolt holes 5 formed in the base plate 2, and the location of the seal lines SL1 and SL2 naturally differ with the kind of a cylinder block and a cylinder head between which the metallic gasket 1 is disposed.

The metallic gasket 1 structured as described is set in place when it is disposed between the joint surfaces of the cylinder block and the cylinder head of an engine and fastened with clamping bolts. The beads are deformed by the fastening force of the clamping bolts and a required sealing pressure is generated along the seal lines to thereby seal oil and so on.

When the gasket is fastened, the thickness-increased portions 16 provided at the peripheral end portion of the combustion chamber opening 3 serve to limit the compression-deformed amount of the beads, a high surface pressure occurs at the thickness-increased portions 16, so that the thickness-increased portion 16 seals a combustion gas at high temperature and high pressure.

When no coating is applied to the surface of the thickness-increased portion 16 to supply the gasket at a low price, the thickness-increased portion 16 of the gasket comes into metal-to-metal contact with the machined surfaces Joint surfaces) of the engine, and consequently there is a tool-mark irregularity of 3 to 6 microns on the machined surfaces.

The explosion pressure by engine operation is not a constantly-applied pressure but a pulsating pressure; therefore, there is some pressure leakage from the thickness-increased portion 16 to the outer periphery side. However, the pressure is sealed by the bead BD on the outer side of the thickness-increased portion 16.

The bead BD according to this embodiment is so structured as to generate a required sealing pressure by a composite spring of the base-plate bead 6 and the rubber bead produced when they are compressed and deformed, and this composite structure makes it possible to reduce the hardness of the base plate 2 that forms the base-plate bead 6. The beads contact the upper and lower joint surfaces at the flat surfaces of the compressed and deformed elastic sealing material 8 and 10, and the soft elastic sealing material 8 and 10 come into tight contact with the joint surfaces, closing any small spaces of the tool marks, thereby sealing the combustion gas that leaks from the thickness-increased portion 16 under pulsating pressure mentioned above.

In a gasket of a structure that an elastic sealing material is filled only in the concave portion of the base-plate bead 6, when the elastic sealing material 10 is compressed and deformed, an external force is generated to deform the base-plate bead 6 and the flat portion on each side continuous to the base-plate bead 6 in such a manner that they warp upward. The lower the hardness of the base plate 2 is made to inhibit fatigue failure of the base-plate bead 6 and hold down the cost of the base plate 2, the more conspicuous the deformation, such as upward warp is likely to become. In this embodiment, the second elastic sealing material 8 is provided also on the convex portion side to let the second elastic sealing material 8 be deformed to prevent deformation of the base-plate bead 6 and the base plate 2, thereby preventing the deterioration of the seal performance by the first elastic sealing material 10 in the concave portion.

In the filling of the first elastic sealing material 10, the center portion of it is likely to cave in a little in a tnansition from high temperature to open cooling. In this embodiment, protrusions 11 and 9 are formed, even when the gasket is adopted in an engine whose fastening axial tension is weak, a stable seal performance can be secured at low lost in the region on the outer side of the combustion chamber opening 3. After the bolts are fastened, the protrusions 11 and 9 are in a crushed and flattened state.

No fastening problem arises in the vicinity of bolts 4 is free of as long as the bolts are fastened properly. However, the oil holes 5 and the chain chamber hole 17 are in an improperly fastened state because they are remote from clamping bolts. As the engine is subjected to repeated thermal cycles as many times as it is used, the fastening axial tension decreases to some extent. The gasket is deformed by heat during engine operation, thus aggravating the sealing condition.

In order to implement a complete seal under those adverse conditions, in the prior art, in the bead structure having the elastic sealing material 10 filled in the concave portion of the base-plate bead 6, if the hardness of the base plate 2 is increased, the spring force is increased, but the bead may suffer fatigue failure by vibration amplitude, and it is not desirable to increase the hardness so much; on the other hand, if the hardness of the base-plate bead 6 is decreased, deformation mentioned above will occur, resulting in a decrease in the spring force. To make up for this shortcoming, in this embodiment, as described above, in addition to the first elastic sealing material 10 filled in the concave portion of the base-plate bead 6, the second elastic sealing material 8 is formed on the convex portion on the reverse side of the concave portion, and the second elastic sealing material 8, structured such that its width is wider than the width of the bead and its height is substantially the same height of the base-plate bead 6, serves to prevent deformation of the base plate 2 and the base-plate bead 6.

As the hardness of the base plate 2 is lowered, the spring force is made low, but because the first elastic sealing material 8 is formed, on the convex portion, with a height equal to the height of the base-plate bead 6 to thereby regulate the deformation by the elastic sealing material 10 filled in the concave portion, with the result that the BD bead is provided with a spring force equal to or greater than a spring force by a structure that uses the base plate 2 of a high-hardness material.

Further, when the elastic sealing material 10 is formed by molding, the concave portion side of the base-plate bead 6 is processed so as to be flush with the flat surface of the base plate 2. During molding, the sealing material 10 expands thermally by high temperature, but when it is open-cooled, the central portion of the rubber large in thickness shrinks by an amount corresponding to thermal expansion, and caves in slightly, and in the portions, away from a clamping bolt, which are not fastened properly and overhang, the surface pressure may decrease, leaving chances of pressure leak.

As countermeasures, according to the invention in this patent application, as shown in FIG. 25, a small protrusion 11 is formed in the middle of the surface of the elastic sealing material 10 in the concave portion of the base plate 6, the bead is deformed without increasing the fastening load so much, and when the surface pressure decreases, the protrusion 11 formed on the surface of the first elastic sealing material 10 bulges and deforms concurrently. Though small in terms of area, the protrusion generates a high surface pressure, and serves to apply a complete seal. In other words, located in a position away from the clamping bolt to the outer periphery side, the surface pressure tends to become relatively small, the elastic sealing material on both surfaces of the base-plate bead 6 is normally pressed to the opposed joint surfaces to seal them by the compressed and deformation of the bead by the fastening load. At this time, the protrusion 11 formed on the elastic sealing material 10 on the concave portion side is deformed in a manner to be pushed into the concave portion, adapts itself to the flat surface of the joint surface, and becomes substantially flush with the flat surface (underside) of the base plate 2.

When, from this steady state, the clearance between the opposed joint surfaces at the bead position increases by vibration, for example, the surface pressure temporarily decreases, the compression-deformed amount of the bead decreases, thus reducing the sealing pressure. At the elastic sealing material 10 on the concave portion side, according to an increase in the clearance, the protrusion 11 automatically bulges to securely retain contact with the opposite joint surface and has the contact surface decreased, and can maintain the seal condition by an increase in the surface pressure by the protrusion. As the clearance decreases, the steady state is restored.

In the foregoing, description has been made of a case where the surface pressure decreases with changes in the clearance between the opposed joint surfaces. Even when the clearance between the opposed joint surfaces remain unchanged or even when the spring force decreases with deterioration with time and the surface pressure becomes smaller, as described above, because load concentrates on the protrusion 11 as the surface pressure decreases (the protrusions 11 and 9 do not necessarily bulge in this case), the surface pressure rises at the position of the protrusion 11, making it possible to maintain a specified sealing pressure.

Figure 27:
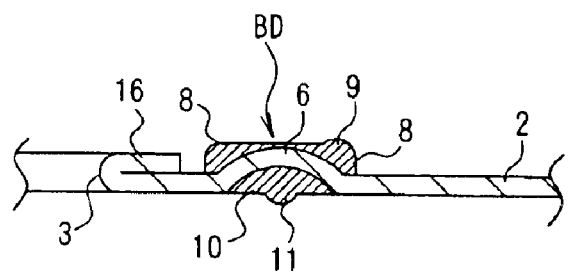
FIG. 27 is a sectional view showing a bead according to the fourth embodiment of the present invention.

When the change in the gap at the bead position between the joint surfaces is large, it is preferable to form a protrusion 9 also on the elastic sealing material on the convex portion of the base-plate bead 6 as shown in FIG. 27.

Figure 28:
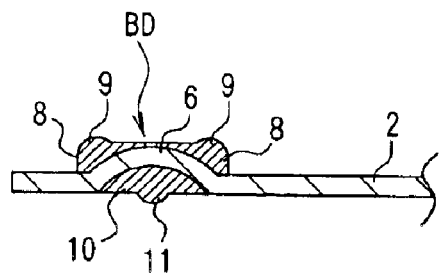
FIG. 28 shows another example of protrusion.
Figure 29:
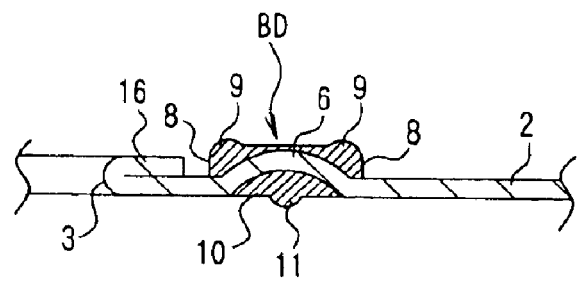
FIG. 29 shows yet another example of protrusion.
Figure 30:
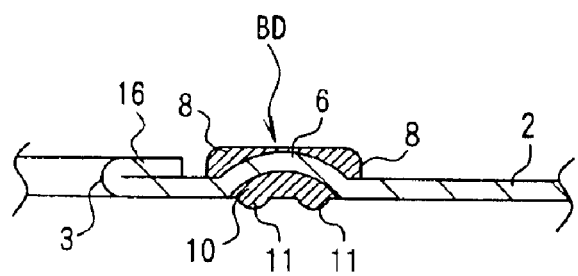
FIG. 30 shows a further example of protrusion.
Figure 31:
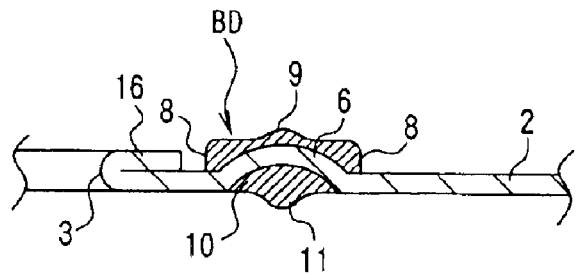
FIG. 31 shows a still furthers example of protrusion.
Figure 32:
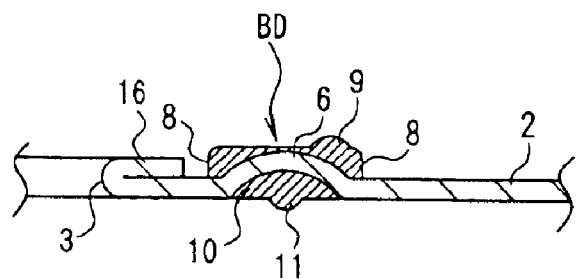
FIG. 32 shows a still other example of protrusion.
Figure 33:
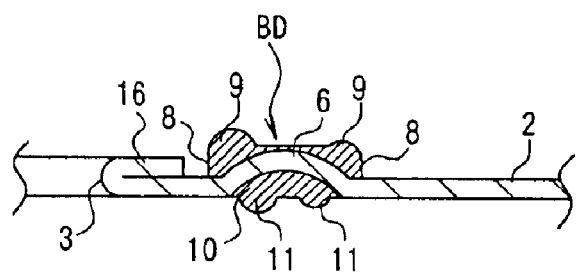
FIG. 33 shows a yet further example of protrusion.
Figure 34:
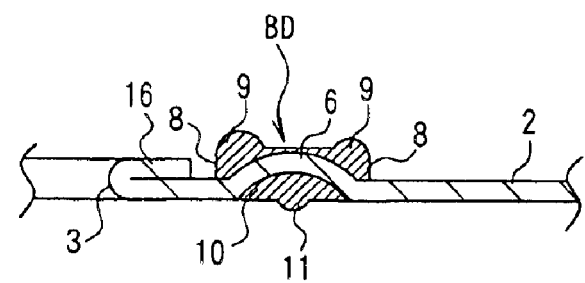
FIG. 34 shows an additional example of protrusion.

The protrusions 11, 9 arranged in the bead-width direction are not limited to one, and may be two or more as shown in FIGS. 28 to 30. When two or more protrusions are provided, the height of the protrusions 11, 9 may be made different. The magnitude of the protrusions may also be different. When a plurality of protrusions are formed, load of surface pressure can be alleviated, or if the surface pressure decreases, a labyrinth effect may be obtained by the plurality of protrusions 11, 9 or the de facto increase of the seal lines SL provides an effect of a stable sealing property for an extended period of time.

Further, with regard to the plurality of protrusions 11, 9, by making variations in the size or shape (the area unit length in a longitudinal sectional profile or a plan view) of the protrusions 11, 9 to seek optimization of the protrusions 11, 8 as shown in FIGS. 31 to 34, it is possible to enlarge the above-mentioned effects. In other words, when providing two or more protrusions in parallel widthwise, it is preferable to make the height of the protrusions 11, 9 relatively low or reduce the area per unit length on the higher surface pressure side.

With regard to a single-line protrusion 11, 9 extending along the seal line, it is possible to change the height or shape of the protrusion 11, 9 according to the surface pressure at the location of the protrusion 11, 9. In other words, in the areas where the surface pressure is relatively smaller, the height and the width of the protrusion 11, 9 may be increased.

The protrusions 11, 9 may be formed continuously along the whole length of the seal lines SL1 and SL2 or intermittently at specified intervals.

When the protrusions 11, 9 are formed partly on the seal lines SL1, SL2, they should be formed at positions that are far from the bolt hole and at relatively low surface pressure or at parts where changes in the clearance between the opposed joint surfaces are relatively large (the amplitude of surface pressure change is relatively large).

Figure 35:
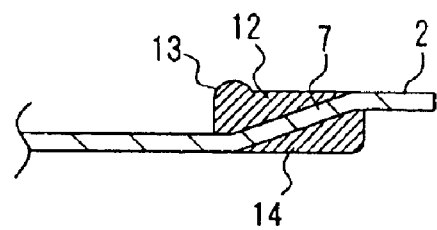
FIG. 35 shows an example of a half bead as the base plate.
Figure 36:
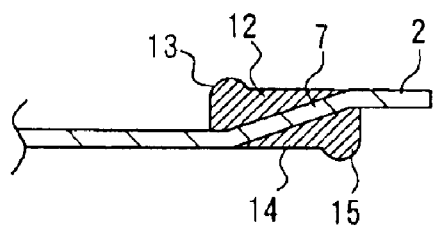
FIG. 36 shows an example of a half bead as the base plate.

In this embodiment, description has been made of the base-plate bead 6 as a full bead, but this embodiment is applicable when the base-plate bead 6 is a half bead in a stepped structure. More specifically, as shown in FIGS. 35 and 36, a second elastic sealing material 12 is fixed to the convex portion (the portion rising from the flat part of the base plate) of the base-plate bead 6 in a stepped form, a first elastic sealing material 14 is applied to the concave portion on the reverse side of the convex portion, and then protrusions 13, 15 are formed at the thick portions. The operation and the effect are the same as in the above-mentioned embodiment.

Figure 37:
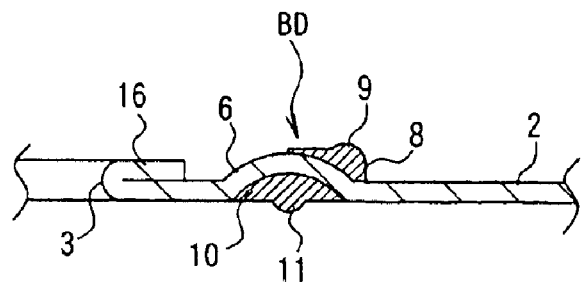
FIG. 37 shows a modification of the second elastic sealing material.
Figure 38:
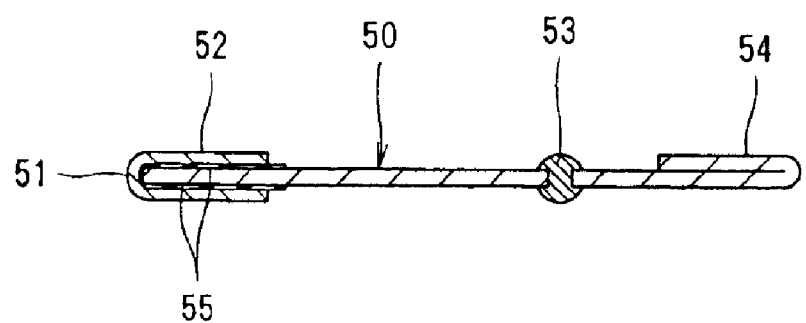
FIG. 38 is a diagram for explaining a conventional metallic gasket.
Figure 39:
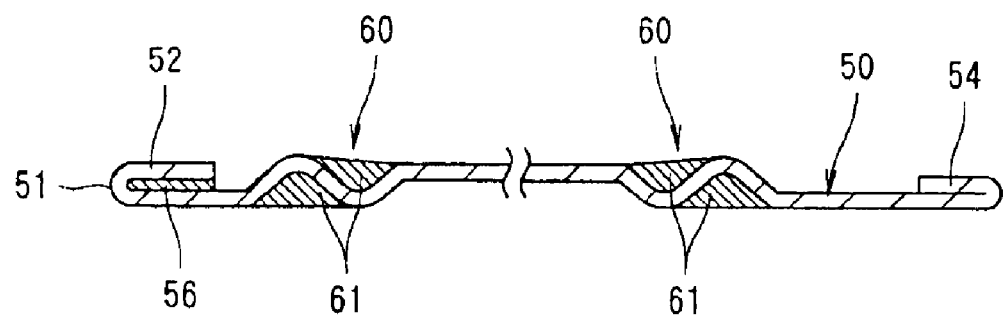
FIG. 39 is a diagram for explaining another conventional metallic gasket.
Figure 40:
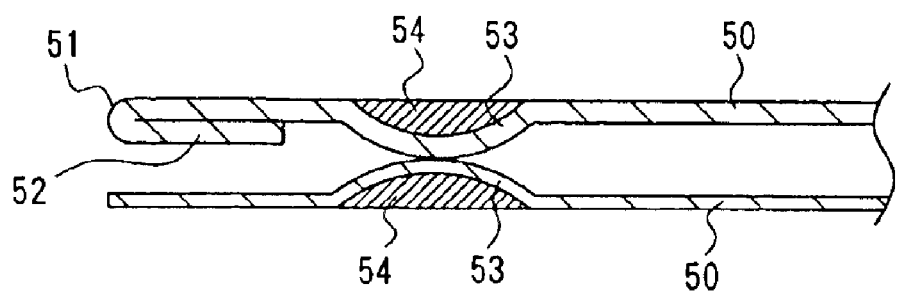
FIG. 40 is a diagram for explaining a conventional metal bead.

In the bead BD in the vicinity of the thickness-increased portion 16, the second elastic sealing material need not necessarily be attached to both sloped sides of the convex portion as shown in FIG. 37. In other words, receiving a relatively high surface pressure and having a strong force to constrain the base plate, the thickness-increased portion 16 inhibits the base plate from being deformed. This applies to the portions in the vicinity of clamping bolts.

The height of the protrusions 11, 9 should be designed such that the deformation ratio is not more than 25% when the protrusions are deformed to reach the thickness of the thickness-increased portion 16, regardless of the shape of protrusions.

In the above example, description has been made of a metallic gasket having a single base plate. In a metallic gasket, a plurality of base plates, each having the above-mentioned structure, may be stacked one over another according to the space between the joint surfaces. In this case, the base plates need not necessarily be stacked such that the convex portions of the base-plate beads are arranged face-to-face with each other as in prior art.

The other aspects of the structure, the operation and the effect are the same as in the above-mentioned embodiments.

INDUSTRIAL APPLICABILITY

As is clear from the above description, by adopting this invention, it is possible to obtain a metallic gasket which exhibits rust-preventing effects by blocking infiltration of moisture, such as salt water, from the outside, and which can securely maintain a satisfactory sealing property for an extended period of time under the conditions, such as sealing-surface roughness, as in engines of violent vibration amplitude, repetition of high and low temperatures, low surface pressure in fastening.

What is claimed is:

1. A metallic gasket comprising a base plate made of a thin metal plate, said base plate having formed therein one or not less than two openings and a metal bead of a convex cross-section formed along seal lines by bending said base plate in the through-thickness direction, said metal bead being deformed in the through-thickness direction to seal a joint of opposing joint surfaces when said metallic gasket is sandwiched between said joint surfaces,
   wherein an elastic sealing material deformable under compression in cooperation with deformation of said metal bead is fixed at least to a convex portion of said metal bead and is filled in a concave portion on the reverse side of said convex portion, and the height of said elastic sealing material on a surface of said convex portion side is made equal to or substantially equal to the height of said convex portion, and wherein on the surface of said base plate on said convex portion side of said metal bead, said elastic sealing material deformable under compression in cooperation with the deformation of said metal bead is fixed also to portions of said surface of the base metal facing at least one of an outer peripheral edge of said joint surface and an inner peripheral portion of an opening of said joint surface opposite said surface of the base plate and
   wherein to the whole peripheral edge of or a part thereof in an least one of an inner peripheral edge of said hole formed in said base plate and an outer peripheral edge of said base plate, a thickness-increased portion is formed by upwardly folding back at least one of said inner peripheral edge of said hole and said outer peripheral edge of said base plate, with a thickness higher than the remaining areas of said base plate and lower than said convex portion of said metal bead to regulate the deformed amount in the through-thickness direction of said elastic sealing material.

2. A metallic gasket according to claim 1, wherein said metal bead is a full bead or a half bead in a stopped form.

3. A metallic gasket according to claim 1, wherein by partly varying at least one of a height of said protrusion and the width of said metal width in the extending direction of said metal bead, the sealing surface pressure is equalized in the extending direction of said bead.

4. A metallic gasket according to claim 1, wherein said metal bead is formed along at least one of an inner peripheral edge of an opening formed in said base plate and an outer peripheral edge of said base plate.

5. A metallic gasket according to claim 1, wherein at least a part of an outer peripheral edge of said base plate extends beyond said opposing joint surface to the outside.

6. A metallic gasket according to claim 1, wherein a thin corrosion-resistant film thinner than said elastic sealing material is fixed to areas not covered with said elastic sealing material at least on one surface of said base plate.

7. A metallic gasket according to claim 1, wherein one or not less than two lines of protrusions are formed along said seal line on at least one of said elastic sealing material fixed to the surface of said convex portion side and the surface of said elastic sealing material filled in said concave portion.

8. A metallic gasket according to claim 7, wherein at least one of the height and the width of each line of said protrusions in the extending direction thereof is varied according to said sealing surface pressure at a formed position of said protrusion, and as said sealing surface pressure becomes small, a larger value is set for at least one of the height and the width of said protrusions.

9. A metallic gasket according to claim 7, wherein a plurality of lines of protrusions are formed on at least one of the surface of said elastic sealing material fixed to said convex portion side and on the surface of said elastic sealing material filled in said concave portion, and wherein in the plurality of lines of said protrusions, at least one of an area per height of said protrusion and an area per unit length of said protrusion is varied according to said sealing surface pressure at a formed position of said protrusion.

10. A metallic gasket according to claim 7, wherein a plurality of base plates are stacked in a multilayered structure.

11. A metallic gasket according to claim 1, wherein one or not less than two lines of protrusions are formed in areas where said sealing surface pressure is relatively low at least on one of the surface of said elastic sealing material fixed to the surface of said convex portion side and the surface of said elastic sealing material filled in said concave portion.

12. A metallic gasket comprising a base plate made of a thin metal plate having at least a combustion chamber opening and a liquid hole, a thickness-increased portion formed at an inner peripheral edge on said combustion chamber opening side of said base plate, and a bead formed along a seal line for sealing by deforming in the through-thickness direction,
   wherein at least a part of said seal line is arranged in a manner to encircle one or not less than two liquid holes, wherein a bead formed along said seal line encircling at least said liquid hole comprises a metal bead formed in a convex form with a height higher than the thickness-increased portion by bending said base plate in the through-thickness direction, and a rubber bead made of an elastic sealing material fixed to the surface on said convex portion side of said metal bead of said base plate or filled in a concave portion on the reverse side of said convex portion, wherein said elastic sealing material on the surface of said convex portion side is fixed at least to the surface of said convex portion of said metal bead and is arranged to be equal or substantially equal in height to said metal bead, and wherein a corrosion-resistant film is formed on the surface of said base plate surrounded by said bead formed along said seal line encircling said liquid hole on said convex portion side of said metal bead and said film has a height lower than the height of said rubber bead, and wherein said thickness-increased portion is formed by upwardly folding back said inner peripheral edge on said combustion chamber opening side of said base plate thereby generating a high surface pressure.

13. A metallic gasket according to claim 12, wherein a thin, corrosion-resistant film is formed on the surface surrounded by said bead formed along said seal line on said concave portion side of said metal bead, and said film is continuous to said elastic sealing material filled in said concave portion.

14. A metallic gasket according to claim 13, wherein a plurality of through-holes are formed at positions of said base plate surrounded by said bead formed along said seal line encircling said liquid hole, and said films formed on both surfaces of said base plate are connected through said plurality of through-holes.

15. A metallic gasket according to claim 12, wherein said film is also applied to the inside peripheral surface of said liquid hole.

16. A metallic gasket according to claim 15, wherein at least a part of said bead formed along said seal line encircling said liquid hole is arranged along the whole peripheral edge of said liquid hole, said elastic sealing material on said convex side is arranged up to said film continuous to said elastic sealing material on said convex side is applied to said inside peripheral surface of said liquid hole, and that the size of said liquid hole including an amount corresponding to said thickness of said film is substantially equal to the size of said liquid hole open to said joint surfaces to be sealed by said gasket sandwiched therebetween.

17. A metallic gasket according to claim 12, wherein a second thickness-increased portion is also formed by upwardly folding back a part of said outer peripheral edge of said base plate, and said seal line extending along said outer peripheral edge is arranged at the outer peripheral edge of the base plate or in the vicinity of said outer peripheral edge, excluding said second thickness-increased portion, wherein said bead formed along said seal line comprises a metal bead formed in a convex form higher than the height of said thickness-increased portion by bending said base plate in the through-thickness direction, and a rubber bead made of an elastic sealing material fixed to the surface of said convex portion side of said metal bead of said base plate and filled in said concave portion and compressed and deformed in the through-thickness direction in cooperation with the deformation of said metal bead, said elastic sealing material on the surface of said convex side is fixed at least to the surface of said convex portion of said metal bead, and the height of said elastic sealing material is arranged to be equal or substantially equal to the height of said metal bead.

18. A metallic gasket according to claim 17, wherein said second thickness-increased portion is omitted, and to substitute for said second thickness-increased portion, a wide-width portion is provided in part along said rubber bead in the extending direction of said rubber bead.

19. A metallic gasket according to claim 18, wherein in a corrosion-resistant film is formed on the whole surface of said base plate on the outer side of said seal line along said outer peripheral edge of said base plate.

* * * * *